Figure 1:
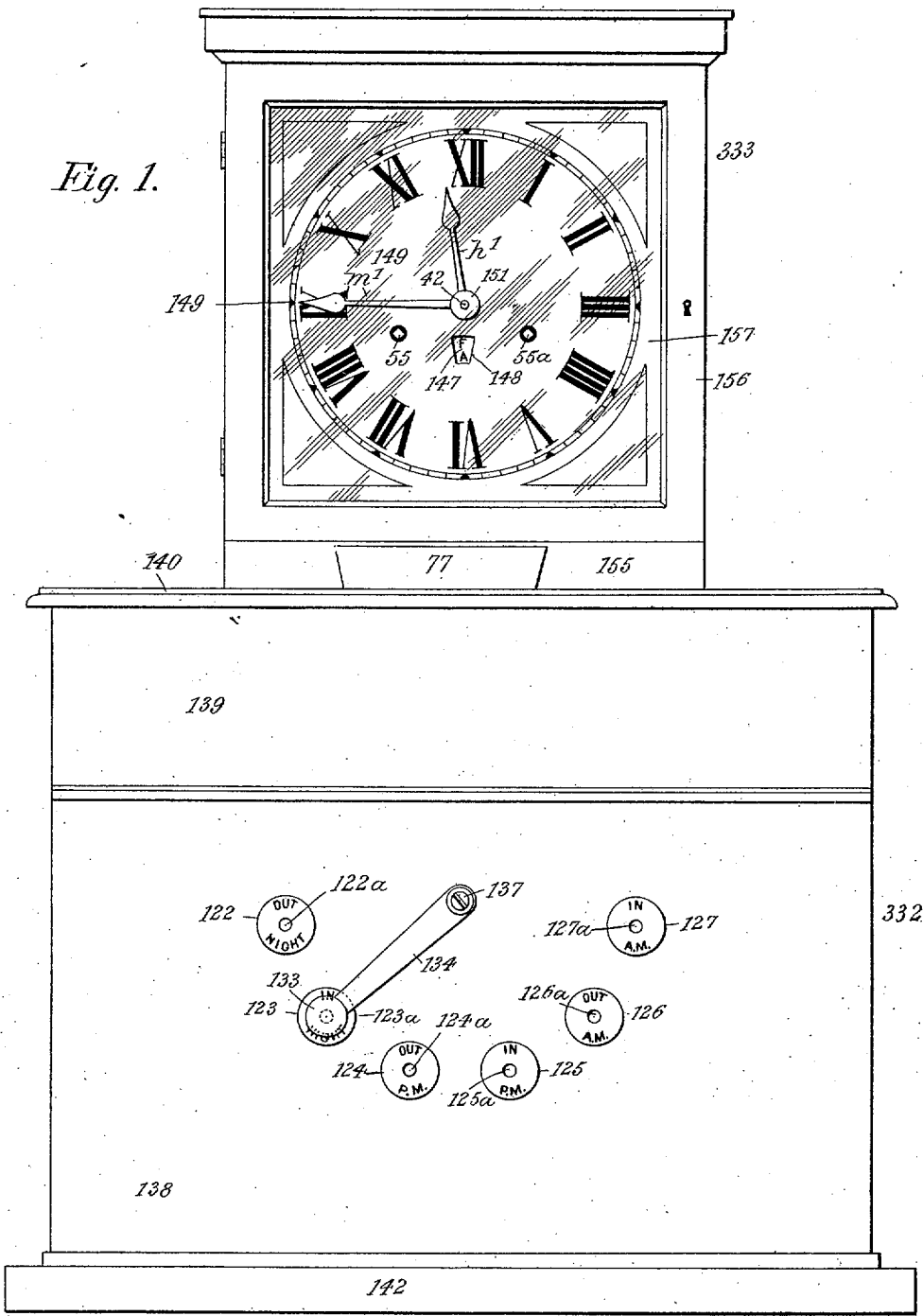

No. 870,742.　　　　　　　　　　　　　　　PATENTED NOV. 12, 1907.
H. B. PALMER.
RECORDING APPARATUS.
APPLICATION FILED NOV. 15, 1904.

13 SHEETS—SHEET 1.

Witnesses:　　　　　　　　　　　　　　　　　　　Inventor
　　　　　　　　　　　　　　　　　　　　　　　Harry B. Palmer
　　　　　　　　　　　　　　　　　　by　　　Albert H. Day Atty No. 870,742.  
PATENTED NOV. 12, 1907.  
H. B. PALMER.  
RECORDING APPARATUS.  
APPLICATION FILED NOV. 15, 1904.  
13 SHEETS—SHEET 2.
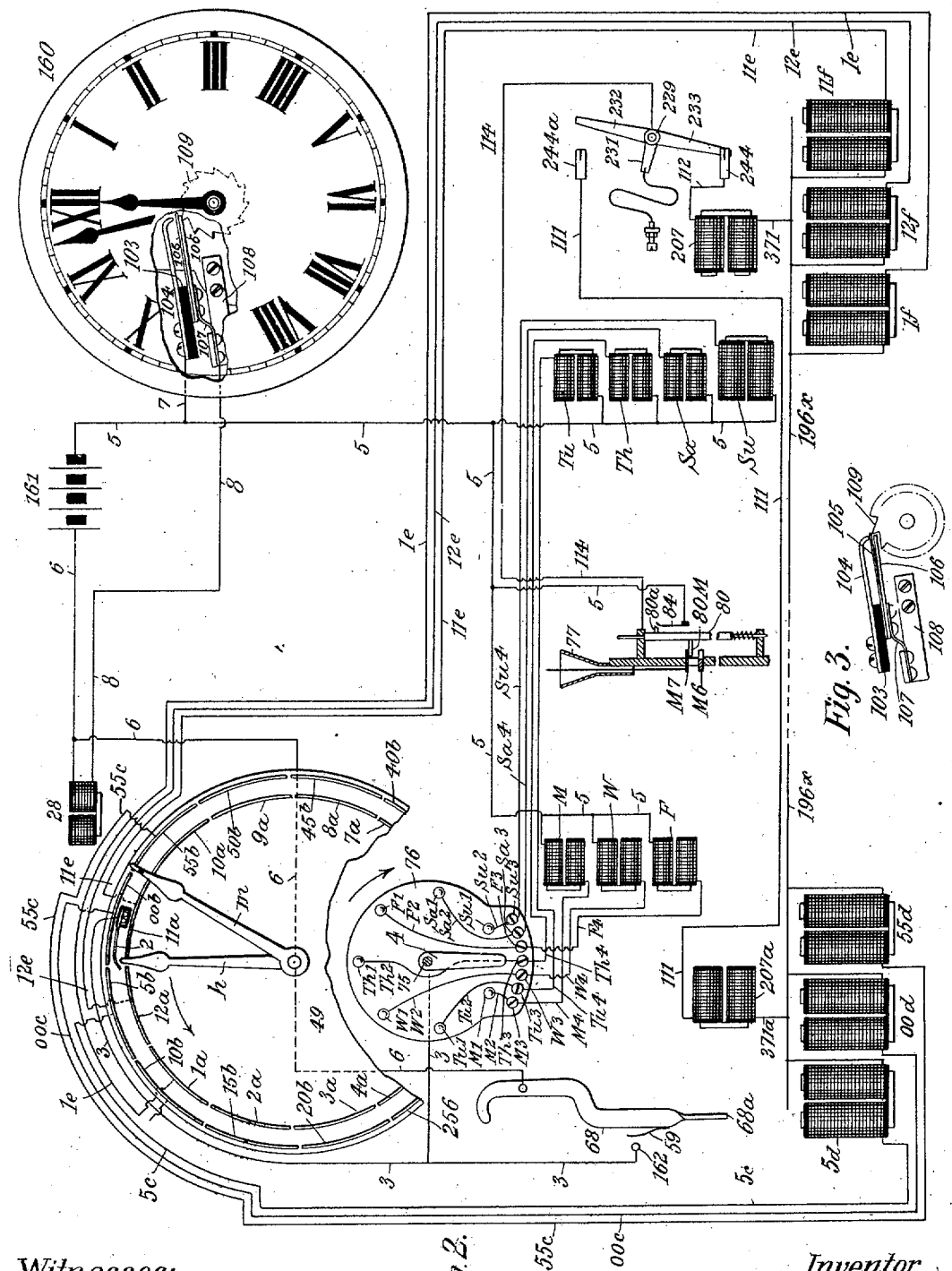
Witnesses:  
Raphaël Netter  
Henry Barnes
Inventor  
Harry B. Palmer  
by Albert H. Day Atty.
THE NORRIS PETERS CO., WASHINGTON, D. C.

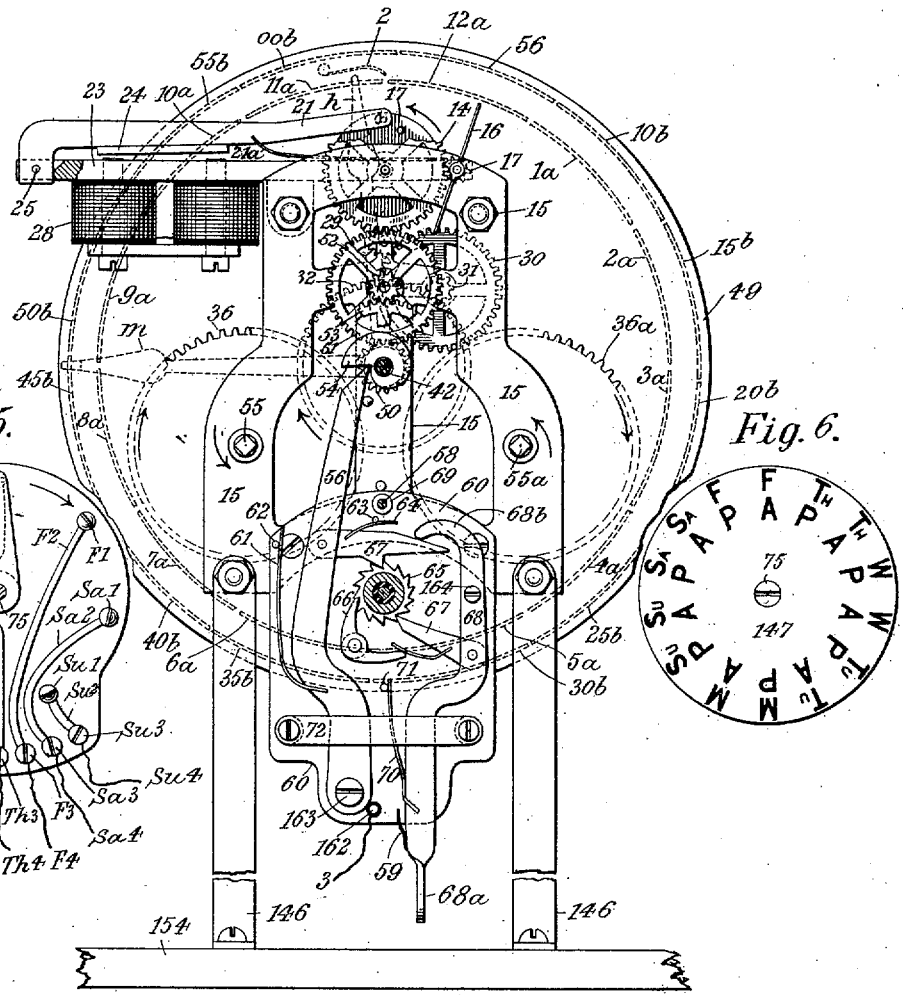

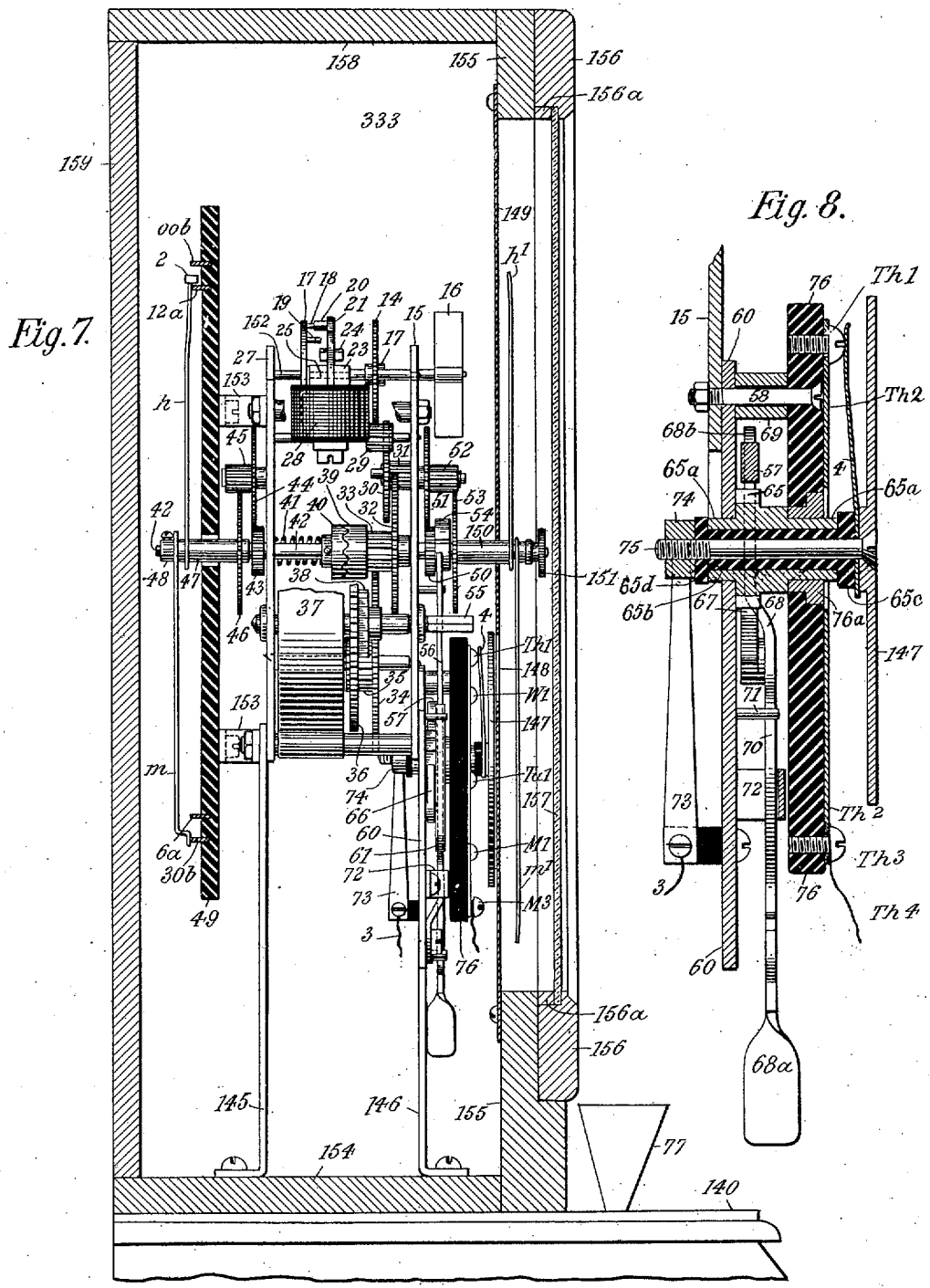

No. 870,742. PATENTED NOV. 12, 1907.
H. B. PALMER.
RECORDING APPARATUS.
APPLICATION FILED NOV. 15, 1904.

13 SHEETS—SHEET 5.

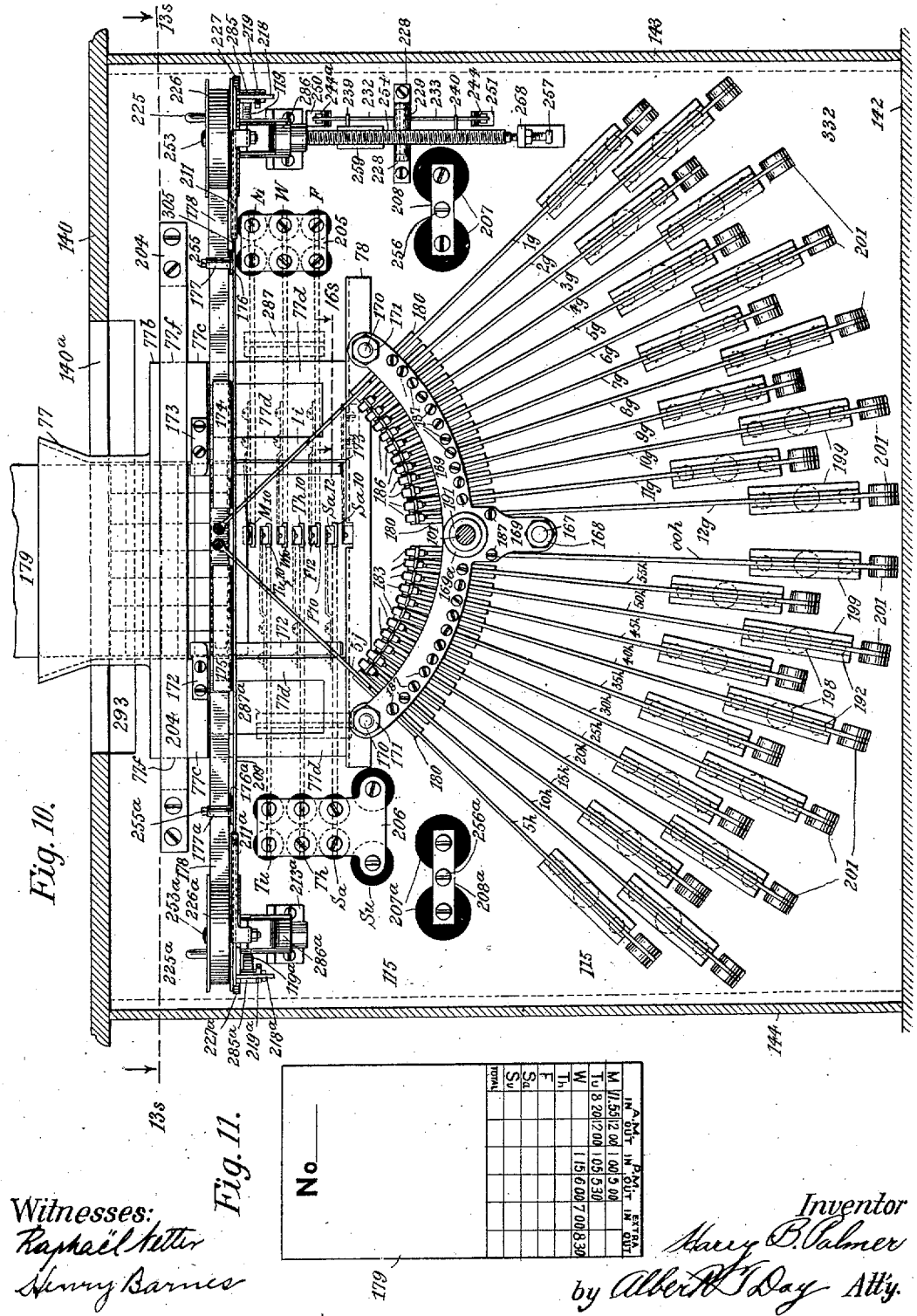

No. 870,742. PATENTED NOV. 12, 1907.
H. B. PALMER.
RECORDING APPARATUS.
APPLICATION FILED NOV. 15, 1904.

13 SHEETS—SHEET 7.

Witnesses:
Raphael Netter
Henry Barnes

Inventor
Harry B. Palmer
by Albert T. Day Att'y.

No. 870,742. PATENTED NOV. 12, 1907.
H. B. PALMER.
RECORDING APPARATUS.
APPLICATION FILED NOV. 15, 1904.

13 SHEETS—SHEET 8.

Witnesses:
Raphaël Petter
Henry Barnes

Inventor
Harry B. Palmer
by Albert T. Day Atty.

No. 870,742.  
PATENTED NOV. 12, 1907.  
H. B. PALMER.  
RECORDING APPARATUS.  
APPLICATION FILED NOV. 15, 1904.  
13 SHEETS—SHEET 9.
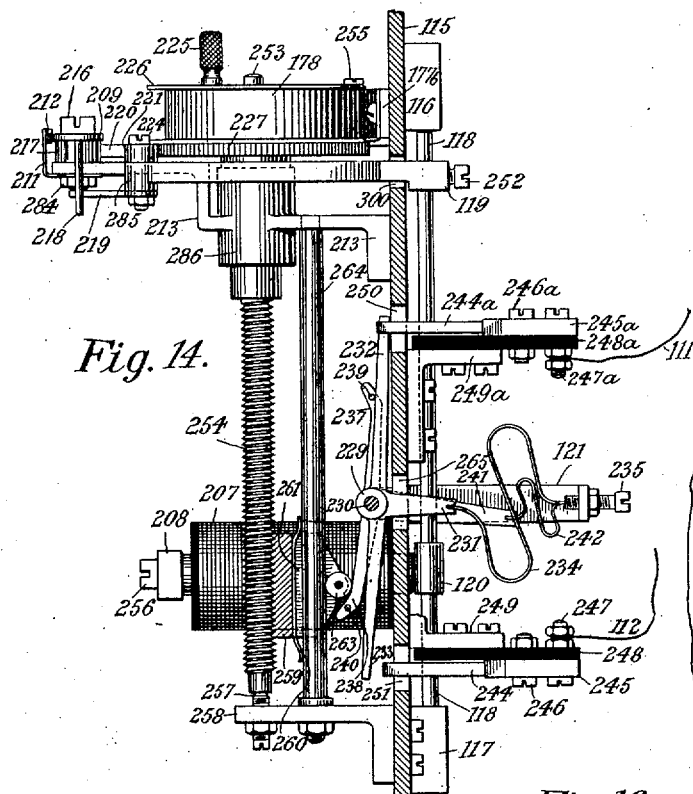
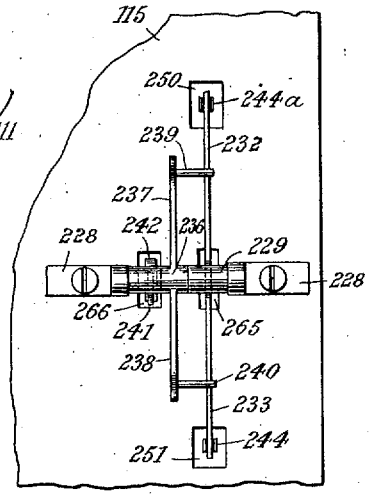
Fig. 15.
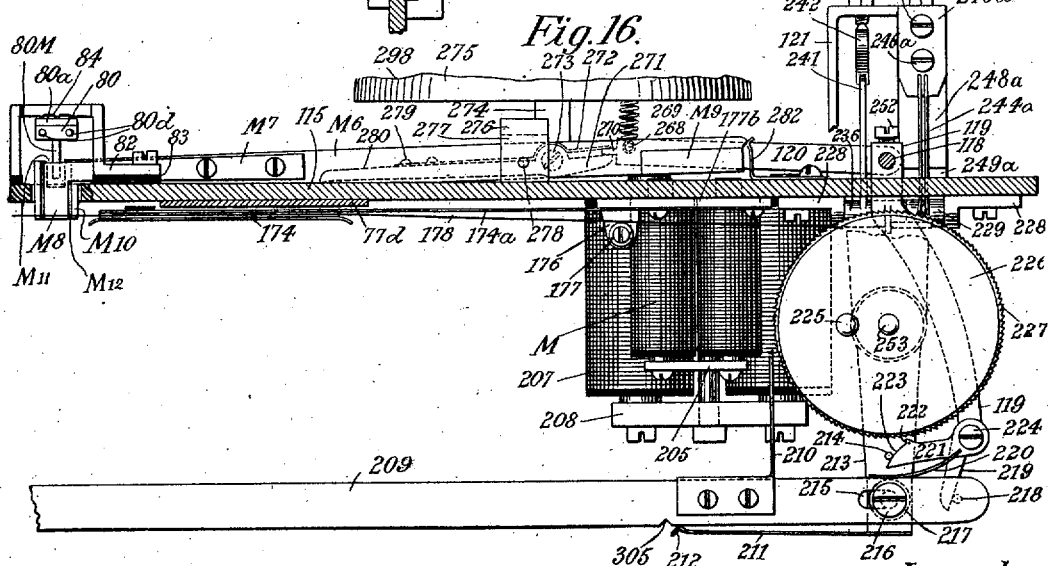
Witnesses:  
Raphaël Netter  
Henry Barnes
Inventor  
Harry B. Palmer  
by Albert T. Day Atty.

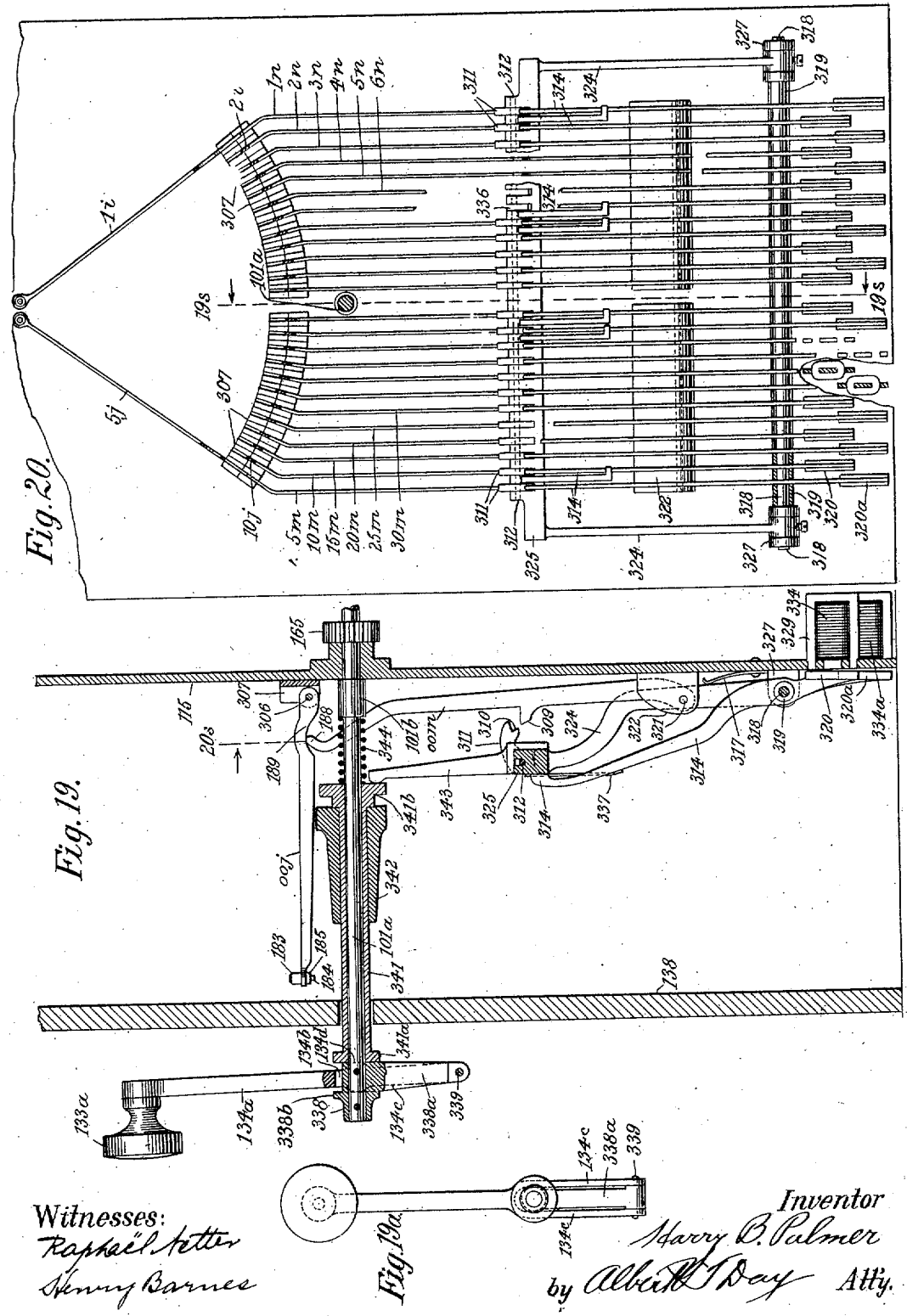

No. 870,742. PATENTED NOV. 12, 1907.
H. B. PALMER.
RECORDING APPARATUS.
APPLICATION FILED NOV. 15, 1904.

13 SHEETS—SHEET 12.

Witnesses:
Raphael Netter
Henry Barnes

Inventor
Harry B Palmer
by Albert J Day Atty.

No. 870,742. PATENTED NOV. 12, 1907.
H. B. PALMER.
RECORDING APPARATUS.
APPLICATION FILED NOV. 15, 1904.

13 SHEETS—SHEET 13.

Witnesses:
Joseph N. Holwell, Jr.
Henry Barnes

Inventor
Harry B. Palmer
by Albert H. Day Atty.

THE NORRIS PETERS CO., WASHINGTON, D. C.

UNITED STATES PATENT OFFICE.

HARRY B. PALMER, OF NEW YORK, N. Y., ASSIGNOR TO GEORGE E. SLY, OF NEW YORK, N. Y.

RECORDING APPARATUS.

No. 870,742.      Specification of Letters Patent.      Patented Nov. 12, 1907.

Application filed November 15, 1904. Serial No. 232,802.

*To all whom it may concern;*

Be it known that I, HARRY B. PALMER, a citizen of the United States, residing in the borough of Manhattan, city of New York, county of New York, and State of New York, have invented certain new and useful Improvements in Recording Apparatus, of which the following is a specification, reference being had therein to the accompanying drawings, forming a part thereof.

Broadly my invention relates to recording apparatus generally including time-controlled recording apparatus, and in various of its specific embodiments, and in all of the specific embodiments illustrated in the drawings accompanying this specification, my invention relates to time-controlled employees' time-recording apparatus for recording the time at which the various employees of a factory or other like institution arrive at or depart from their place of work, or for recording the time at which the various employees commence or complete a given job or portion of their day's work.
My invention may be embodied in divers forms of employees' time-recording apparatus, and in various of its specific embodiments, and in all its specific embodiments illustrated in the accompanying drawings, my invention is embodied in employees' time-recording apparatus for the so-called "individual card system" in which a separate card is assigned to each employee and is used as a record medium upon which the time-recording apparatus may print or make a record of the time of that employee. Such individual card systems are sometimes known as "unlimited" time-recording systems, since the number of employees whose time may be recorded thereby is practically unlimited, in contradistinction to the "limited" time-recording systems in which the time of all the employees is kept upon a single card or record medium so that there is necessarily a limit to the number of employees whose time can be recorded by the apparatus.

In various of its embodiments my invention relates to distributed time-recording systems which employ a number of separate time-recording mechanisms or apparatuses located at different points throughout a factory or like institution and commonly controlled, for instance through a controlling electric circuit, by a common master chronometer or time controller. Such distributed time-recording systems are particularly useful in what is known as the "cost system" in which the workmen are required to record the time of commencing and the time of completing the various separate jobs or pieces of work to which they are assigned during the day, in order to determine the cost of the labor involved in such separate jobs. In such a cost system it is practically essential that various recording apparatuses should be located in the various rooms or work shops throughout the factory in order to be readily accessible to the workmen in such rooms as their jobs are commenced and completed.

The objects of my invention, broadly stated, are simplicity and reliability of operation, simplicity and economy of construction, and economy of maintenance.

Another object is to make the recording operation entirely automatic so that the workman or employee is required merely to place his card or record medium into the recording mechanism or apparatus in order to make the desired record upon the card.

My invention has many objects which might be stated in more specific terms as subservient to the broad and general objects above mentioned, for instance—it is one object of my invention to maintain the recording mechanism or record marking mechanism of the time-controlled recording apparatus normally *in statu quo*, that is to say, so that its record markers or recording devices proper do not move continuously or periodically under influence of the controlling chronometer, but are normally stationary and therefore only consume power when they are moved in the operation of marking a record upon the record medium or card.

Another object of my invention is to make the record markers or recording devices proper separately and independently operatable or movable so that in the event of injury to one of the record markers or its operative mechanism the operation of the other record markers will not be affected.

Divers other objects subservient to the broad purposes of my invention might be enumerated at this point, but can be most readily brought out, however, in the course of the more detailed specification which follows and which describes particularly those specific embodiments of my broad invention which have been illustrated in the accompanying drawings.

Figure 9:
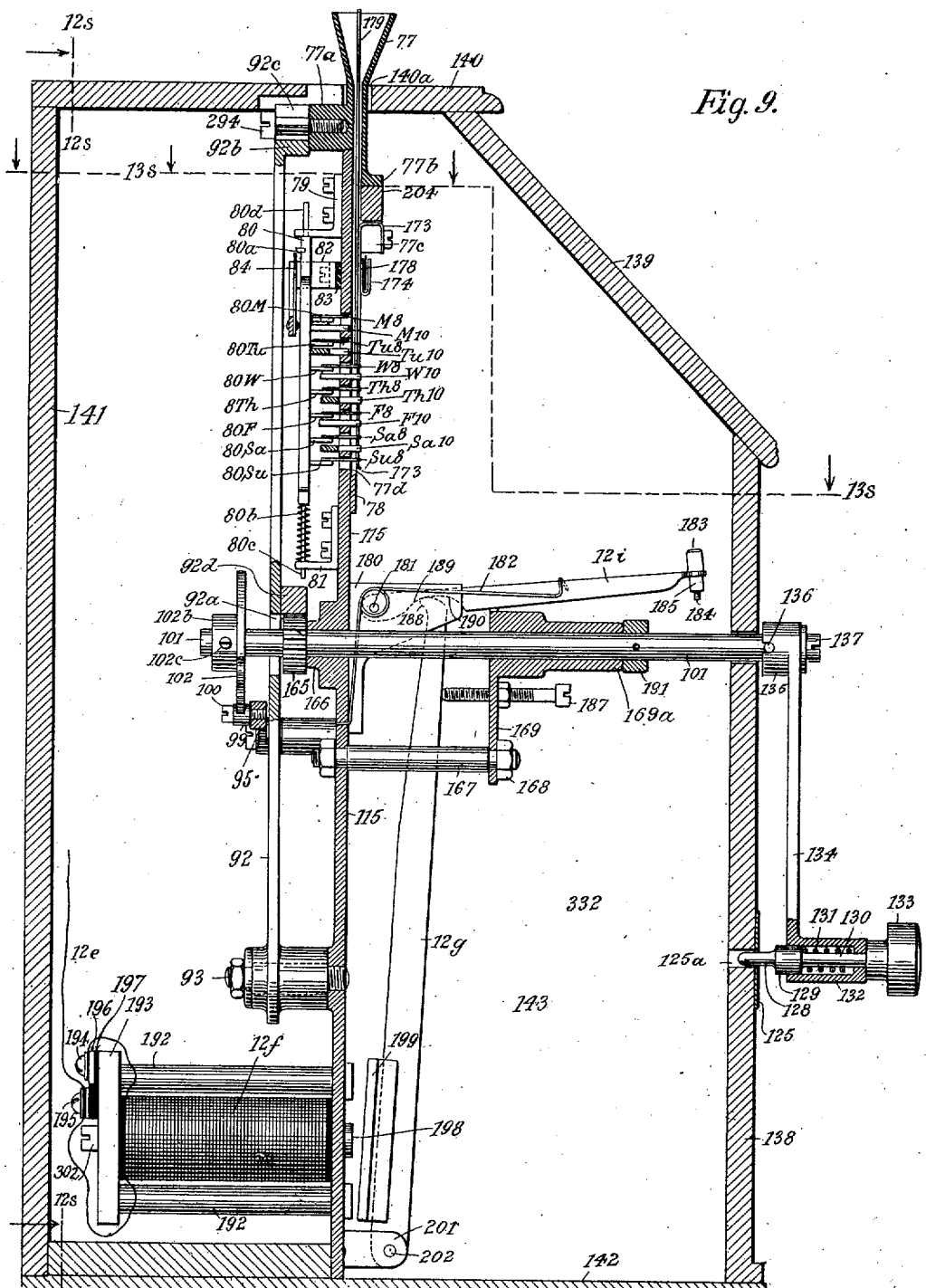
Figure 12:
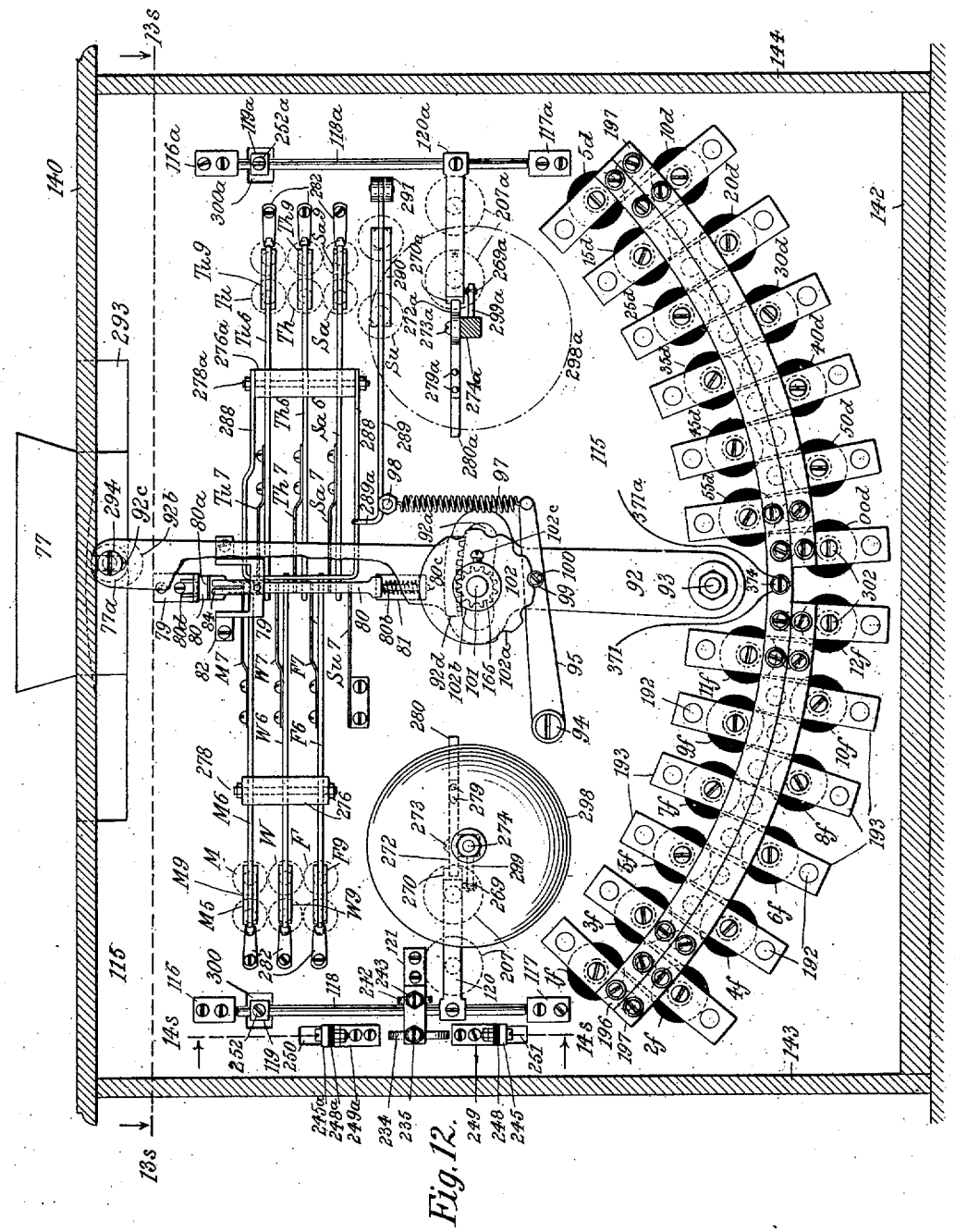
Figure 13:
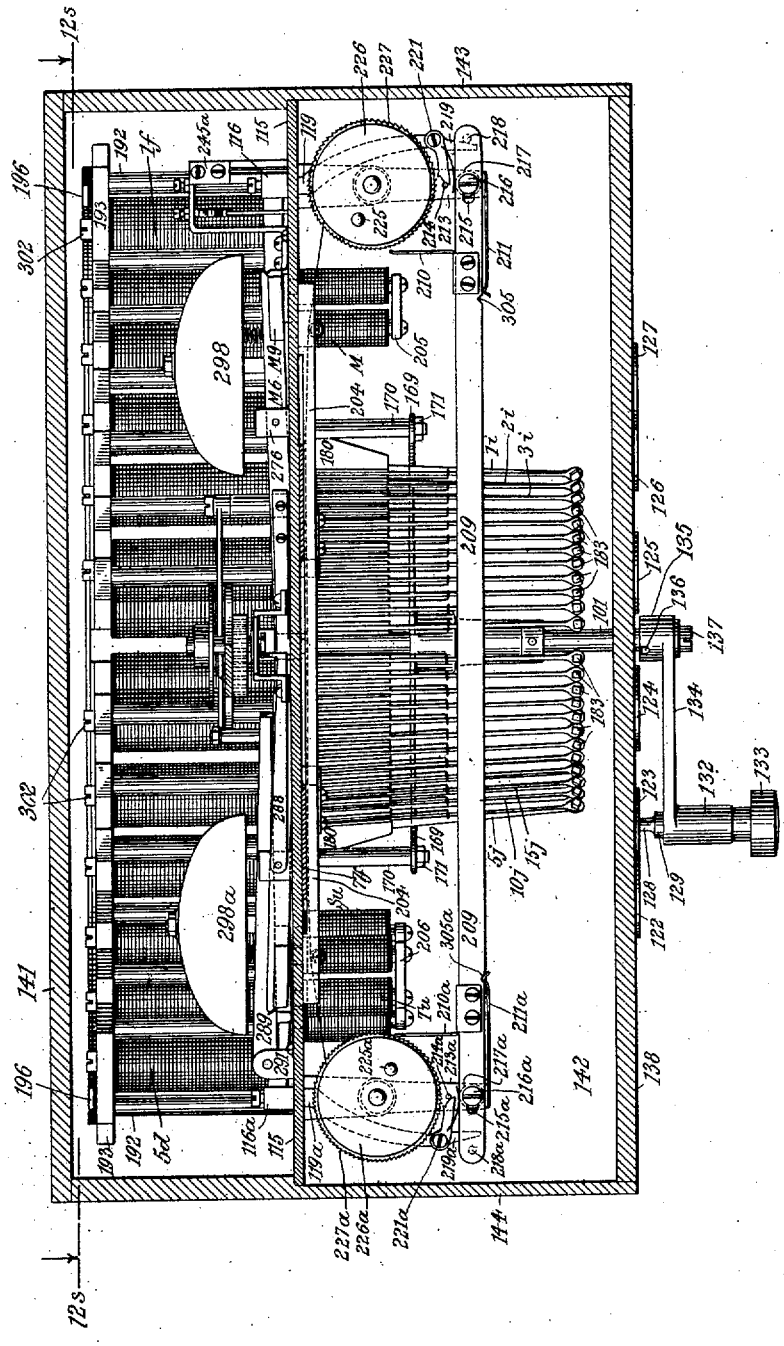
Figure 18:
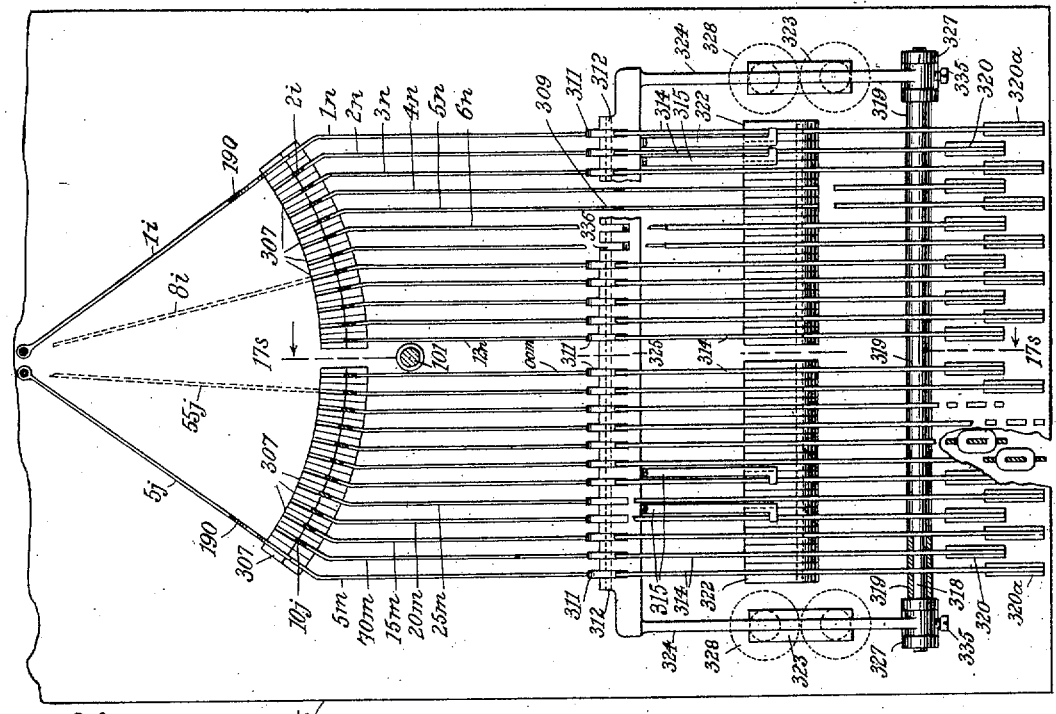
Figure 17:
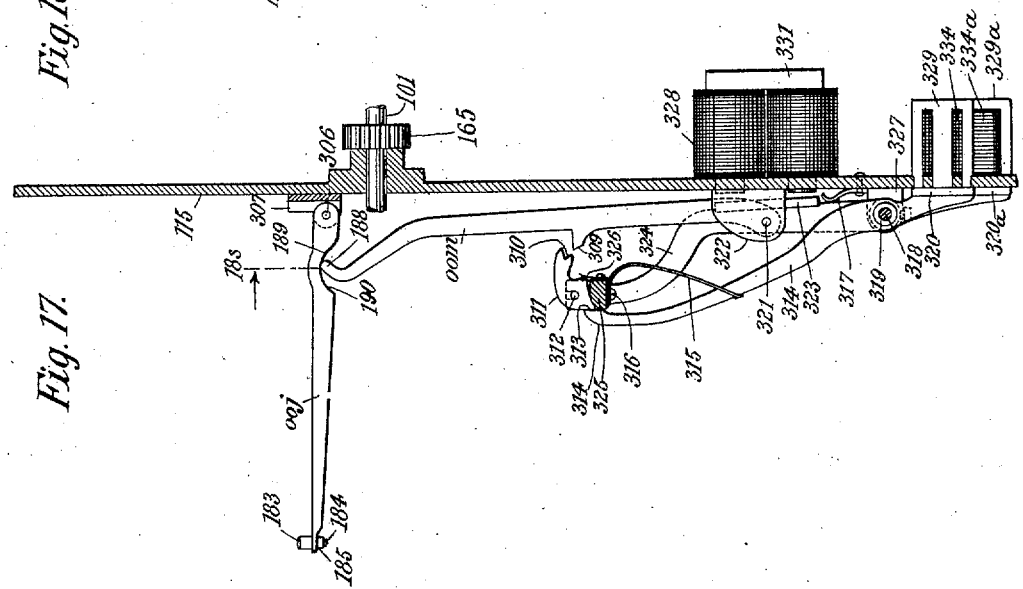
Figure 21:
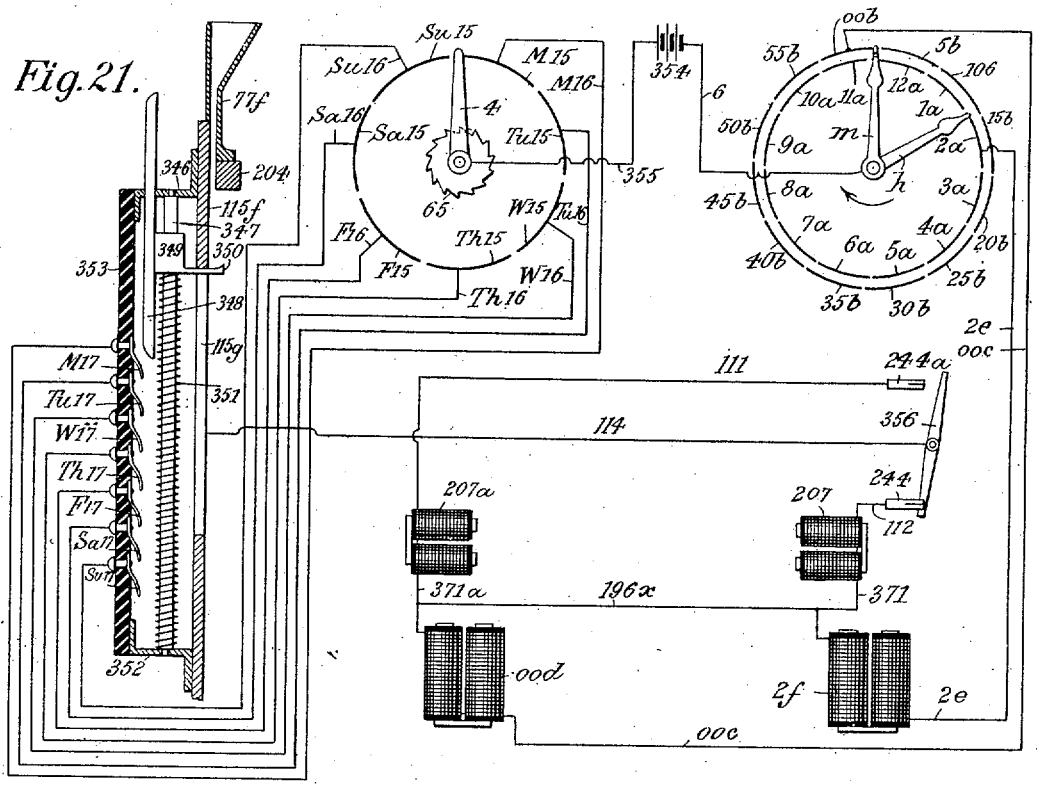
Figure 22:
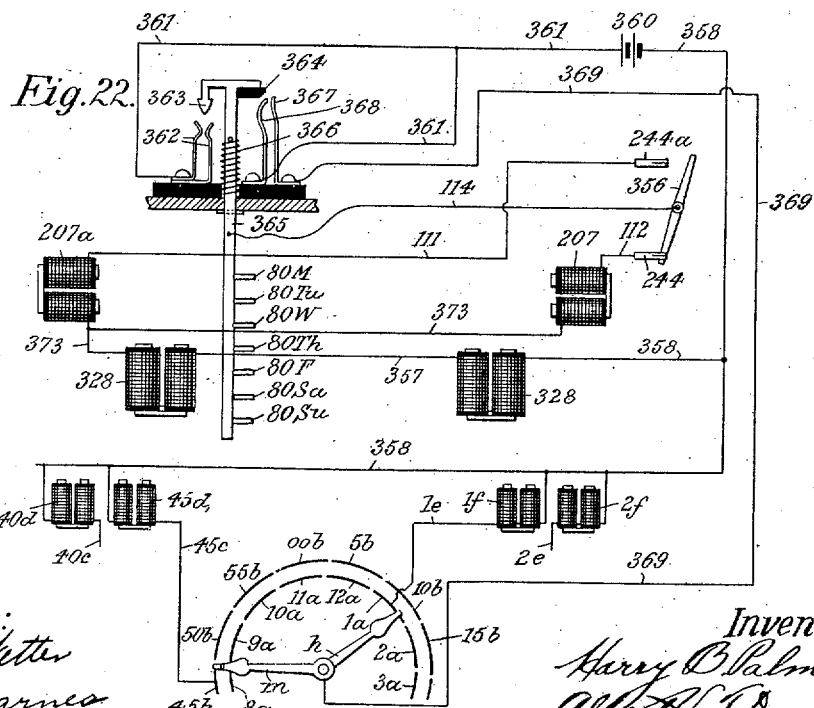
Figure 23:
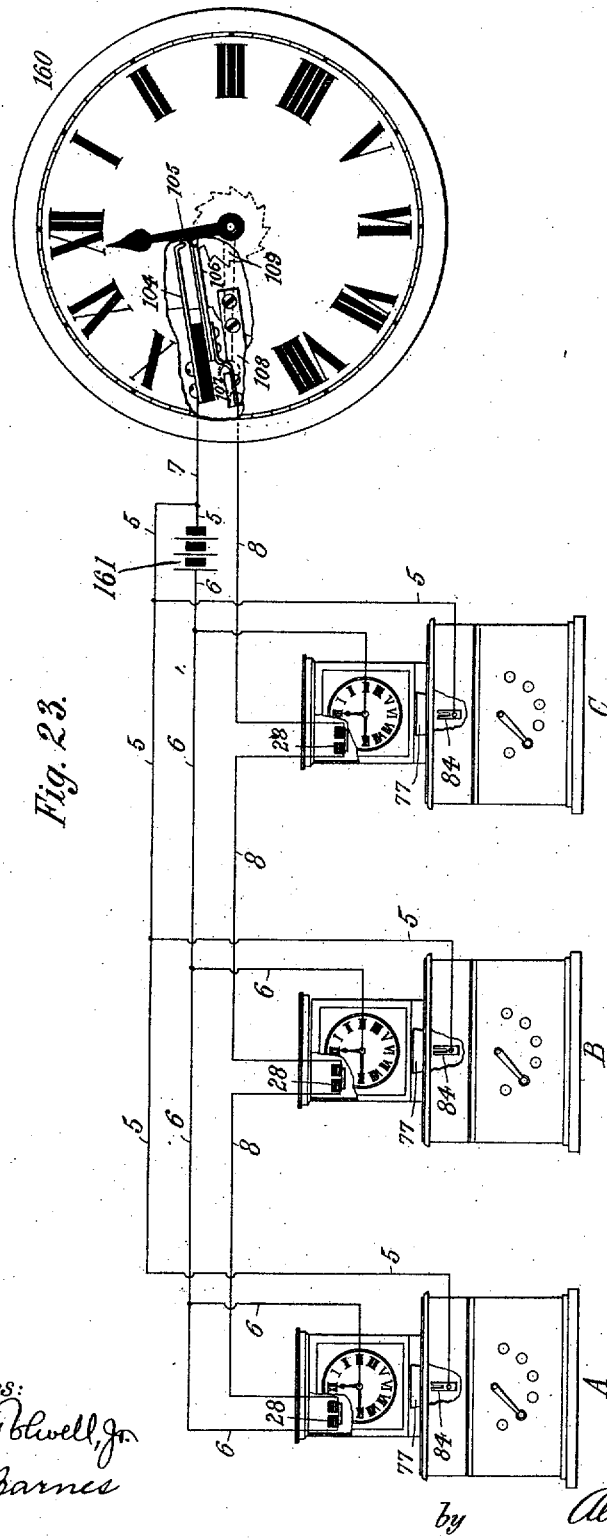

In the accompanying drawings—Figure 1 is a front elevation of a time-recording apparatus embodying my invention and adapted to be controlled either separately or as a sub-apparatus together with similar time-recording apparatuses in a distributed time-recording system, by a master chronometer which is not shown in this figure. Fig. 2 is a diagram of electrical circuits illustrating the manner in which the master chronometer or time controller 160 controls a recording apparatus such as that shown in Fig. 1 and selectively determines the particular record markers or recording devices proper which shall be operated at any given instant to mark a record upon the card or record medium. Fig. 3 is a detail view showing the contact making position of the contact making device of the master chronometer 160 shown in Fig. 2. Fig. 4 is a partly sectional front elevation of the electrically controlled clock movement or sub-movement contained in the smaller or upper casing 333 of the recording apparatus shown in Fig. 1, and operating as a sub-movement controlled by the master chronometer. The view point in this figure is the same as that of Fig. 1 and is from the right of Fig. 7, which shows the same sub-movement, and the section is taken on a plane inside the dial 149 and inside the hour hand gear 53 and also inside the calendar contact board 76, all of which parts are shown in Fig. 7. Fig. 4ª is a detail elevation of the magnetically actuated escapement lever 21 of the sub-movement shown in Fig. 4, together with its coöperating escapement disk 17. This view shows the escapement lever in the act of permitting its coöperating escapement wheel to escape one step. Fig. 5 is a front detail elevation of the calendar contact board 76, the view point being from the right of Figs. 7 and 8, the calendar dial 147 being removed and the calendar-wiper spindle 75 being shown in section. Fig. 6 is a detail front elevational view of the calendar dial 147. Fig. 7 is a substantially central sectional elevation of the electrically controlled sub-movement shown in Fig. 4, and Fig. 7 shows this sub-movement together with its containing case 333 and from a view point to the left of Figs. 1 and 4. Fig 8 is a detail sectional elevation of the calendar commutator and its accessory mechanism shown in Figs 4, 5, 6 and 7. The section is taken in the vertical plane of the wiper spindle 75 and the view point is the same as that of Fig. 7. Fig. 9 is a substantially central sectional elevation of the recording mechanism contained in the larger or lower casing 332 shown in the general view, Fig. 1. The view point in Fig. 9 is from the left of Figs. 1 and 10 and also from the left of the plan view Fig. 13, and from the right of Fig. 12. Fig. 10 is a front partly sectional elevation of the recording mechanism shown in Fig. 9, the view point of Fig. 10 being the same as that of Fig. 1 and being from the right of Fig. 9 and from the front of Fig. 13. The containing case 332 is shown in section on a vertical transverse plane passing through the hopper slot 140ª (Fig. 9), and the hand shaft 101 is shown sectioned at a point outside its collar 191 (Fig. 9). Fig. 11 is a front view of a time card or record medium such as may be employed to receive a recording mark from the recording mechanism. The card is shown in its inverted position in which it is to be placed in the card hopper 77 of the recording mechanism in order to receive its record. Fig. 12 is a partly sectional rear elevation of the recording mechanism, the view point being from the left of Fig. 9 and from the rear of Fig. 13, and the section being on the plane indicated by the line 12ˢ in Figs. 9 and 13. Fig. 13 is a partly sectional plan view of the recording mechanism, the section being taken on the plane indicated by the line 13ˢ in Figs. 9, 10 and 12. Fig. 14 is a partly sectional elevation of a portion of the ribbon feeding mechanism. The view point is from the right of Figs. 10, 13 and 16 and is from the left of Fig. 12, and the section is taken on the plane indicated by the line 14ˢ of Fig 12. Fig. 15 is a detail front elevational view of the reversing switch of the ribbon feeding mechanism. The view point is the same as that of Fig. 10 and is taken from the front of Figs. 13 and 16 and from the left of Fig. 14. Fig. 16 is a partly sectional plan view of that portion of the ribbon feeding mechanism shown in Figs. 14 and 15 and of one ($M^6$) of the card positioning calendar levers or day levers, together with its accessory mechanism. In this view that portion of the main frame plate immediately surrounding the end $M^{10}$ of the calendar lever is sectioned on a plane just above the spring $M^7$ carried by that lever, and the remaining portion of the main frame plate is sectioned on a plane just above the contact bracket 82. In this view the card slide 77ᵈ is sectioned on the plane indicated by line 16ˢ of Fig. 10. Fig. 17 is a central sectional side elevation of a modification of a portion of the recording mechanism illustrated in the foregoing figures. The view point of Fig. 17 is from the right of Fig. 18 and the section in Fig. 17 is taken on the central plane indicated by the line 17ˢ of Fig. 18. Fig. 18 is a front elevational view of the modification illustrated in Fig. 17 and is taken from a view point to the left of Fig. 17 and shows all but two of the type bars or recording devices proper lying in their horizontal or non-operating positions and sectioned on the plane indicated by the line 18ˢ of Fig. 17. Fig. 19 is a central sectional side elevation of still another modification of the recording mechanism shown in the foregoing figures. This figure illustrates a construction wherein hand power of the operator is employed to actuate the type bars, in lieu of electric power employed in the constructions of the foregoing figures. The view point in Fig. 19 is from the right of Fig. 20 and the section of Fig. 19 is taken on the central plane indicated by the line 19ˢ of Fig. 20. Fig. 19ª is a front detail elevation of the manually operated handle 134ª of the mechanism shown in Figs. 19 and 20. The view point of Fig. 19ª is from the left of Fig. 19. Fig. 20 is a front elevational view of the modified construction shown in Fig. 19, the view point in Fig. 20 being from the left of Fig. 19, all but two of the type bars or record markers being shown in their horizontal or non-operating positions and sectioned on the plane indicated by line 20ˢ of Fig. 19. Fig. 21 diagrammatically illustrates a modification in the calendar mechanism or card positioning mechanism which locates the card, when it is placed in the hopper of the recording mechanism, in position to receive its record mark in or upon the proper day column of the card, as determined by the day (day of the week) upon which or during which the record is made. Fig. 22 diagrammatically illustrates a modification in the card-controlled circuit-closing switch for throwing into circuit the magnets which control and actuate the record marking mechanism. This modification is particularly well adapted for coöperation with the recording mechanism shown in Figs. 17 and 18. Fig. 23 diagrammatically illustrates a distributed employees' time-recording system in which a number of sub-recorders or sub-recording apparatuses are electrically controlled by a common master chronometer.

The recording mechanism proper, or that portion of the time-recording apparatus which actually prints the time record on the time card, is contained within the lower box or casing 332 of the recording apparatus illustrated by the external view of Fig. 1. This casing comprises a suitable base board such as 142, a vertical back board 141 secured to the back edge of the base board, vertical side boards 143 and 144 mounted upon the right and left edges of the base board, a vertical lower front board 138 mounted upon the front edge of the base board, a rearwardly slanting upper front board 139 extending upward from the upper edge of the lower front board, and a horizontal top board 140 secured upon the upper edges of the back board and side boards and the upper or slanting front board. A vertical main frame plate 115 is mounted within the casing as a partition extending across the casing from one side board to the other and from the base board to the top board. Along the lower and vertical sides of the main frame plate its inner surface abuts against and is firmly secured to shoulders formed respectively upon the base board and upon the vertical side boards. The main frame plate extends upwardly to and engages with the under side of the top board 140 except at the middle portion on the upper edge of the frame plate where it is provided with a slot 293 which acts as a guide for the shiftable card hopper 77.

The hand shaft or hopper-shifting shaft 101 projects forwardly through the vertical or lower front board 138 of the casing of the recording mechanism, and thence extends rearwardly into the casing and through the journal 169ᵃ of the shaft bracket 169, and thence through the main frame plate 115 at a point where the plate is provided with a journal boss 166, which may be formed integrally, as shown, upon the rear side of the plate. The inner or rear end of the hand shaft extends some distance beyond, or in rear of, the rear end of the journal boss 166 and projects through an arc shaped slot 92ᵃ formed in the hopper-shifting rock arm 92, which at its lower end is provided with a suitable hub pivotally mounted upon a stud 93 inserted into a suitable boss formed upon the rear side of the main frame plate 115 at a point underneath the journal boss or hand shaft bearing 166. The hand shaft carries a pinion 165 located between the hopper-shifting rock arm 92 and the journal boss 166. This pinion is rigidly fixed to the shaft and meshes with an internally toothed arc rack 92ᵈ fixed upon the front face of the hopper-shifting rock arm 92 and disposed about the pivotal stud 93 of the rock shaft as a center. The arc shaped slot 92ᵃ is also disposed about such pivotal stud as a center, the purpose of the slot being to permit rocking movement of the rock arm 92 without interference from the hand shaft 101. A positioning or locking ratchet or cam 102 is secured upon the rear end of the hand shaft 101 by means of a set screw 102ᶜ which passes through the hub 102ᵇ of the locking ratchet and engages the hand shaft. A locking lever 95 is pivotally mounted upon a stud 94 inserted into the rear side of the main frame plate at a point to one side of the hopper-shifting rock arm 92. From this pivotal stud the locking lever 95 extends laterally underneath the hand shaft 101 and between the hopper-shifting rock arm and the lower edge of the locking ratchet 102. A locking roller 99 is mounted upon a spindle stud 100 inserted in the rear face of the locking lever 95 at a point underneath the locking ratchet 102. The free or swinging end of the locking lever 95 extends some distance beyond the locking ratchet 102 and is connected to the lower end of a tension spring 97 extending upward and at its upper end anchored to a suitable spring stud 98 inserted in the rear side of the frame plate 115 at a point above the swinging end of the locking lever. The tension spring 97 tends always to force the locking lever upward so as to maintain its locking roller 99 in engagement with the periphery of the locking ratchet 102, and the periphery of this locking ratchet is provided with a number of locking notches or serrations 102ᵃ, into which the locking roller enters as the locking cam is rotated. When the locking ratchet 102 has been rotated so as to bring the locking roller 99 into locking position in one of the locking notches 102ᵃ, the locking ratchet will be retained or locked in such locking position and its hand shaft 101 will thereby be prevented from any further angular movement until it is forcibly impelled by the hand crank 134 so as to forcibly raise the locking roller out of engagement with the locking notch.

The hand crank 134 is provided with a suitable hub 135 secured by means of a cotter pin 136 and locking screw 137 upon the front or outer end of the hand shaft 101 where the shaft projects through the front board 138 of the casing. Upon the lower or swinging end of the hand crank 134 is formed a forwardly projecting spring barrel 132 bored from its rear end with a bore of sufficient diameter to receive a compression spring 131, which is interposed between the bottom of the spring bore at the forward end of the spring barrel and a suitable spring collar 129 formed upon the rear or inner end of the plunger stem 130 around which the spring is coiled. The spring collar fits and is guided by the rear end of the spring bore. The outer or forward end of the plunger stem 130 passes through a guiding bore in the outer or forward end of the spring barrel and of smaller diameter than the spring bore, and such forward end of the plunger stem is inserted in and secured to the handle 133. A rounded teat or locking projection 128 extends from the rear end of the spring collar 129 toward the front board 138 of the casing and is normally inserted into one of the locking holes 122ᵃ, 123ᵃ, 124ᵃ, 125ᵃ, 126ᵃ or 127ᵃ, which are bored into the face of the front board 138 and respectively surrounded by metallic escutcheons 122, 123, 124, 125, 126 and 127. These escutcheons bear suitable inscriptions such as those illustrated in Fig. 1 and corresponding to certain columns upon the record medium or time card, and each designating the beginning or the ending of a certain period of occupation, the beginning and ending of which it is desired to record upon the time card in terms of hours and minutes. The pressure of the compression spring 131 upon the spring collar 129 normally thrusts the plunger stem and its locking teat or projection rearward toward the front plate and thus maintains the locking teat in its locking engagement with either one of the locking holes in which it has been placed, and in such locking position of the plunger stem its handle 133 is held against the forward or outer end of the spring barrel 132 and acts as a stop to limit the rearward thrust of the spring upon the plunger stem.

When it is desired to operate the hand shaft, the handle is drawn forward by the operator, thus compressing the locking compression spring 131 and withdrawing the locking teat 128 of the plunger stem from the locking hole in which it has been inserted, and the hand crank 134 may then be rotated so as to impart rotation to the hand shaft 101. The hand shaft is fixed in longitudinal position by means of a collar 191 secured with a cotter pin upon the hand shaft and abutting the outer or forward end of the shaft journal 169ᵃ so as to prevent longitudinal movement of the hand shaft in rearward direction, and by means of the abutment of the hand shaft pinion 165 against the rearmost end of the journal boss 166 which prevents longitudinal movement of the hand shaft in forward direction. The hand shaft pinion 165 and the locking ratchet 102 are both securely fixed upon the inner end of the hand shaft and rotate with the hand shaft, and each position of the hand crank 134 which enables it to be locked by one of the locking holes passing through one of the escutcheon plates on the front of the casing, also brings the locking ratchet 102 into position to be locked by the locking roller 99.

The rotation of the hand shaft pinion 165 causes the hopper-shifting rock arm 92 to swing about its pivotal center 93 in one direction or the other according to the direction in which the hand shaft is rotated. The rock arm 92 at its uppermost end terminates just underneath the top board 140 of the casing, and this upper or swinging end of the rock arm is provided with a suitable boss or lug 92$^b$ having a slot 92$^c$ disposed longitudinally with respect to the rock arm. A hopper stud 294 passes through this slot and is inserted into the back end of a boss 77$^a$ formed upon the rear side of the card hopper 77. The head of the hopper stud 294 overlaps the slot in the rock arm and bears upon the rear side of the slotted end of the rock arm so as to retain it firmly in position.

The card hopper consists of a hopper proper 77 projecting from the inside of the casing upward through a slot 140$^a$ in the top board 140 of the casing and having its portion which rises above the surface of the top board provided with flaring sides so as to facilitate the introduction of a record card. The lower edge of the rear side of the hopper rests upon and is guided by the bottom of the hopper-guiding slot 293 in the top edge of the main frame plate, and the stud boss 77$^a$ is formed on such rear side of the card hopper just above the guiding edge of the slot. The lower edge of the front side of the card hopper proper 77 is forwardly and laterally extended into a horizontal guiding rib 77$^b$, which rests upon and is guided by the upper edge of a horizontal guide bar 204 screwed at its ends upon the front side of the main frame plate 115. The rear side of the guide bar 204 is cut away between its ends, which are screwed to the frame plate so as to provide a guiding space for receiving the guide webs 77$^f$ of the hopper which are integrally and dependingly formed upon and at opposite ends of the horizontal guide rib 77$^b$. Upon each of the guiding webs 77$^f$ and just underneath the horizontal guide bar 204 is integrally formed a lower guiding rib 77$^c$ projecting forwardly under the horizontal guide bar so as to engage its lower edge. Thus the upper horizontal guiding rib 77$^b$ and the guiding web 77$^f$ and the lower guiding ribs 77$^c$ together form the sides of a channel in which the horizontal guide bar 204 is embedded. The lower guiding webs 77$^d$, provided with rectangular apertures to reduce their weight, are formed integrally depending from the lower edges of the lower guiding ribs 77$^c$, and the lower edges of these lower guiding webs 77$^d$ are guided by means of a suitable lower guide bar 78 mounted on the front side of the main frame plate 115 and underneath the ends of the hand shaft bracket 169, and secured by means of the bracket studs 170 and their clamping nuts 171, which serve to fasten the shaft bracket as well as the lower guide bar 78. A pair of left and right flat card-guiding springs 172 and 173 are mounted upon the front sides of the lower guiding ribs 77$^c$ and at the inner ends of such lower guiding ribs, that is to say, at their ends nearer the vertical center line of the hopper. These card-guiding springs depend from their points of support in substantial parallelism with, and near to, the front side or surface of the main frame plate 115 and are also parallel with and disposed just within the inner vertical edges of the lower guiding webs 77$^d$. When the time card 179 is inserted into the card hopper 77, as illustrated in Figs. 9 and 10, it passes down between the lower guiding webs 77$^d$ and also between the card guiding springs and the front face of the frame plate 115, and the card guiding springs hold the card securely in position and flatly against the front surface of the frame plate. As the hand crank 134 is shifted from one position to another, the consequent rotation of the hand shaft 101 and its hopper-shifting pinion 165 meshing with the arc rack 92$^d$ on the hopper-shifting rock arm 92, causes such rock arm to swing from one position to another so that its upper slotted end impels the hopper-shifting stud 294 and causes the card hopper to slide laterally from one position to another along its horizontal guide bars 204 and 78 and along the front face of the frame plate 115 against which it is held by such guide bars, and thus is determined the lateral position of the time card as it is placed into the card hopper to receive a record.

The calendar-controlled card-positioning levers or day levers M$^6$, Tu$^6$, W$^6$, Th$^6$, F$^6$ and Sa$^6$, which operate to determine the printing position of the card on Monday, Tuesday, Wednesday, Thursday, Friday and Saturday, respectively, are horizontally and pivotally mounted on the rear face of the frame plate. These day levers are mounted in two sets of three each, one set including the levers M$^6$, W$^6$ and F$^6$, and the other set including the levers Tu$^6$, Th$^6$ and Sa$^6$. The levers of the first set are disposed on the right (looking toward the machine from in front) thereof of the vertical center plane of the latitude of transverse movement of the card hopper, and are mounted in a common pivot lug 276 secured to the rear side of the frame plate. The levers of the other set are similarly mounted upon the left side of the center plane of lateral movement of the card hopper and are likewise mounted in a common pivot lug 276$^a$ secured to the rear side of the frame plate. The sides of the common pivot lugs 276 and 276$^a$, which abut against the rear face of the frame plate, are provided with slots such as 277 (Fig. 16) to receive the day levers, which are of flat form, and common pivot pins 278 and 278$^a$, respectively, pass through the common pivot lugs and through the pivotal centers of their respective day levers. The opposing sets of day levers are staggered and their inner or adjacent ends interlap at the center plane of lateral movement of the card hopper. The set including the levers, M$^6$, W$^6$ and F$^6$, is higher than the opposite set of day levers so that the lever M$^6$ is first in successive order of the levers from the upper one to the lower one, such successive order being the order of the days of the week commencing with Monday and to which the day levers correspond or during which they are operative to position the time card in receiving its record.

The inner overlapping ends of the day levers are provided with forwardly extending card-engaging tongues such as M$^{10}$, which project through individual holes in the frame plate and extend a short distance beyond or in front of the front surface of such plate so as to intersect the vertical plane or path of movement in which the time card is inserted into the card hopper. Flat card-engaging and switch-operating springs M⁷, Tu⁷, etc., which may be designated as day springs, are mounted upon the day levers near their inner ends and have forwardly extending tongues such as M⁸ corresponding in form to the card-engaging tongues of the day levers themselves, and pass through the same frame holes as the card-engaging tongues of the day levers upon which the springs are respectively mounted. The card-engaging tongues upon the day springs are narrower than the card-engaging tongues upon their respective day levers, and the card-engaging tongues upon the levers are provided with channels such as M¹² into which the card-engaging tongues of the day springs may be depressed so that the tongues of the springs and levers may be flush upon their upper surfaces when the springs are pressed down by the time card as it is inserted in the hopper to receive a record.

A vertically sliding card operated switch which controls the actuative electric circuits of the recording mechanism, is mounted upon the rear face of the frame plate 115 just behind the interlapping ends of the day levers. This sliding switch is provided at its upper end with two vertical guiding pins 80ᵈ which are inserted into the upper end of the main bar 80 of the switch and which slide vertically in guide holes in the rearwardly projecting horizontal leg or extension of the upper L-shaped guide bracket 79 screwed upon the rear face of the frame plate. The lower guiding pin 80ᶜ is likewise secured to the lower extremity of the vertical main bar 80 and is guided in a suitable guide hole in the rearwardly projecting horizontal leg of another L-shaped guide bracket 81 similar to the guide bracket 79 and similarly mounted upon the frame plate. A retractive compression spring 80ᵇ is coiled upon the lower guiding pin 80ᶜ and interposed between the horizontal leg of the lower guide bracket 81 and the lower end of the main bar 80 of the switch. This retractive spring 80ᵇ tends always to return the main switch bar, and all the parts carried thereby, to their uppermost positions which are determined by the abutment of the upper end of the main bar 80 against the horizontal leg of the guide bracket 79 acting as a stop. The main bar 80 of the card operated switch carries a contact blade 80ᵃ which, when the main bar slides downward, engages and makes rubbing conductive contact with a contact spring 84 vertically mounted upon a suitable bracket 82 which straddles the main bar 80 and which is secured upon, but insulated from, the rear face of the frame plate. Inserted into the front face of the main bar 80 of the card operated switch and arranged in vertical order and projecting forwardly from the main bar, are a number of switch actuative pins 80ᴹ, 80ᵀᵘ, 80ᵂ, 80ᵀʰ, 80ᶠ, 80ˢᵃ and 80ˢᵘ. When the card actuated switch is in its normal or uppermost position where it is stopped by the upper guide bracket 79, each of these switch actuative pins lies just above the inner end of one of the day levers and just underneath the free or movable end of the day spring of that particular day lever, so that, as the movable end of the day spring is carried downward by the downward pressure of a time card upon the upper side of its card-engaging tongue, the movable end of the day spring engages the switch actuative pin and presses the pin and the card actuated switch downward, compressing the retractive compression spring 80ᵇ and causing the contact blade 80ᵃ to make contact with its coöperating contact spring 84. The rear edges of the inner ends, or the interlapping ends, of the day levers are provided with pin-clearing slots such as M¹¹ (Fig. 16) in order to permit the switch actuative pins to move freely downward through such pin clearing slots and without interference from the day levers. Of course, as soon as the downward pressure upon one of the switch actuative pins is relieved, the retractive compression spring 80ᵇ returns the card operated switch to its normal position and breaks contact between the contact blade 80ᵃ and its coöperating contact spring 84.

Upon the outer ends of the day levers, that is to say, upon their swinging ends outside their axes and opposed to their interlapping ends, are mounted magnetic armatures M⁹, Tu⁹, W⁹, Th⁹, F⁹, and Sa⁹, named in the order of their respective day levers from top to bottom. A number of actuative day magnets M, Tu, W, Th, F and Sa, coöperate with these magnetic armatures. These day magnets are mounted upon the front face of the main frame plate 115 and are divided into two sets, corresponding to the sets into which their day levers are divided, one set of magnets being disposed on either side of the middle of the frame plate. The polar ends of the magnet cores pass through the frame plate, which is made of non-magnetic material to avoid magnetic short-circuiting of the flux from the magnets, and at their inner ends the poles of the magnets are presented to their respective armatures mounted upon the day levers. When any one of these day magnets is energized, its armature will be drawn forward toward the poles of the magnet and the day lever, which carries the armature and corresponds to the particular day magnet which is energized, will be swung about its pivotal axis so as to move its inner or interlapping end rearwardly and partially withdraw its card-engaging tongue from the aperture in which it projects through the frame plate. Of course the card-engaging tongue of the day spring is simultaneously withdrawn together with the card-engaging tongue of the day lever upon which the day spring is mounted, and this retractive movement of the day lever and its day spring is sufficient in extent to completely withdraw their card-engaging tongues from their positions in which they intersect the plane of, or path of movement of, the time card as it is inserted into the card hopper; so that after such retractive movement or withdrawal of the card-engaging tongues of the day lever and its day spring, the time card as it is inserted into the card hopper will pass in front of the tongues and without engaging them or being stopped by them. Each day lever is retained in either of its two extreme positions, that is to say, in either its card-engaging position or its card-clearing position, by means of an L-shaped detent spring 282, one leg of which is secured by a screw to the rear side of the frame plate and the other leg of which projects horizontally rearward and at its end engages with lateral pressure a small V-shaped extension formed upon the outer swinging end of the day lever and projecting just slightly beyond its magnetic armature. When the day lever is in one of its extreme positions, the detent spring presses on one side of the V-shaped extension and when the lever is in the opposite position the detent spring presses on the other side of the V-shaped extension, and in either case it requires some effort to force the V-shaped extension against the lateral pressure of the detent spring so that the detent spring shall pass from one side of the extension to the other, and by opposing such resistance to either movement of the day lever, the detent spring tends to hold it in either one of its extreme positions until it is forcibly moved to the other extreme position.

Should all the card-engaging tongues of the day levers and their day springs be withdrawn from card-engaging positions, the card, when inserted by the operator into the card hopper, would then be pushed down in front of and beyond the card-engaging tongues of all the day levers and their springs, and the lower edge of the card would ultimately come into contact with the card-engaging tongue of an extra card-engaging spring or day spring $Su^7$ mounted directly upon the rear face of the frame plate 115 at a point to the right of the center of the mechanism and extending horizontally leftward toward the center of the mechanism, its card-engaging tongue being similar to the card-engaging tongues of the other day springs and likewise projecting from the free or movable end of the day spring forwardly through an aperture in the frame plate disposed in vertical alinement with the apertures through which the other card-engaging tongues project, and being the bottom one of the vertical series of apertures.

A U-shaped day-lever replacing bridge or replacer 288 has its parallel arms disposed in horizontal planes and pivotally mounted on the ends of the pivot lug 276ª of the left hand set of day levers, and upon the ends of the common pivot pin 278ª of such set of day levers. From their pivotal mountings the horizontal arms of the U-shaped replacing bridge extend rightward to a point near the vertical longitudinal center plane of the mechanism where such horizontal arms are joined by the cross bar or bridge proper which is disposed vertically just behind the interlapping ends of the day levers so that the vertical cross bar forms a sort of bridge extending over the movable interlapping ends of both sets of day levers so as to engage such interlapping ends of the day levers and force all of them, together with their day springs or card-engaging springs, forward into card-engaging positions, when the replacing bridge is swung forwardly about its pivotal axis. Such forward swinging movement of the replacing bridge is effected by means of a replacing lever 289 located just below the lower horizontal arm of the replacing bridge and swinging in a horizontal plane about its pivotal mounting in the pivot lug 291 secured to the rear face of the frame plate at a point on the left side of the mechanism. The extreme right or swinging end of the replacing lever 289 is bent into an upwardly extending finger 289ª which projects behind the lower horizontal arm of the U-shaped replacer and engages such arm to push the replacing bridge forward when the replacing lever is swung forward about its pivotal center by the attraction of a magnetic armature 290, secured upon the replacing lever, toward its magnet Su secured upon the front side of the frame plate just underneath the left hand set of the day-lever actuative magnets. The polar ends of the cores of this day-lever replacing magnet Su project through the frame plate 115 and are presented toward the armature 290 of the replacing lever.

The left hand set of actuative day magnets, together with the replacing magnet Su, have a common magnetic back iron 206, while a common magnetic back iron 205 is likewise provided for the right hand set of day magnets.

The type bars or recording devices proper, such as 12¹, (Fig. 9) are pivotally mounted upon independent pivot pins such as 181 and within independent type bar brackets such as 180 secured upon the front face of the frame plate 115 and underneath the card hopper. The type bars are divided into two sets of twelve each, one set on either side of the vertical longitudinal center plane of the mechanism, one of the sets for printing the hours and the other set for printing the five-minute intervals of the hour. The hour set of type bars is disposed on the right and the minute set on the left. Each type-bar bracket consists in a plate 180 of the outline clearly indicated in Fig. 9 and provided with a central slot parallel to the plane of the plate which receives the flat pivotal end of the type bar and prevents its torsional displacement so as to maintain the type bar in its proper plane of pivotal movement. The type-bar brackets and pivotal pins of each set of type bars are arranged in circumferential order about, or with respect to, a common striking or printing center or axis, and the common printing centers of the hour and minute sets of type-bar brackets and type bars, are located side by side just above the tier of interlapping ends of the day levers, the common printing center of the hour set being on the right and that of the minute set on the left. The type bars lie normally in substantially horizontal positions. At their outer ends they are formed into rounded heads upon which are mounted the types proper or record markers proper such as 183. These types proper are provided with stems, such as 184, which are inserted through the heads of the type bars and upon which are screwed fastening nuts such as 185 which rigidly secure the types upon the ends of their respective type bars. All the type bars of either the minute or hour set swing upwardly about their pivotal centers so as to bring their types proper into common printing positions which are located at the common centers about which their respective sets of pivotal brackets are disposed in successive order in the arcs of circles. The lower edges of the type bars have curvilinear gouges 190 near their pivotal ends, and these gouges form cam surfaces 189. The type bars are actuated by magnetically operated type-bar actuators or actuating levers, such as 12ᵍ and 00ʰ of the hour and minute set respectively, which are formed of flat stock and at their lower ends pivotally mounted on suitable pivot pins 202 and in suitable pivot lugs such as 201. Each set of type-bar actuators has its pivot lugs arranged in a staggered series disposed in or along concentric arcs described about the common striking or printing center of its corresponding set of type bars. The upper or cam-engaging ends 188 of the actuators enter the slots in the type-bar brackets and normally project upward into the curvilinear gouges 190 and engage the cam surfaces 189 thereof, while the type-bars normally rest upon such cam-engaging ends of the type-bar actuators as stops which limit the downward or retractive movements of the type bars. The type bars are normally held in such normal or retracted positions, and after being actuated are returned to such normal positions by means of type-bar retractive springs such as 182, having one end inserted for anchorage in the front face of the frame plate at a point below the pivotal center of the type bar and having the other end or movable end hooked to pass over the upper edge of the type bar and press the type bar down into its normal position.

Upon the rear edge of each type-bar actuator and near its lower or pivoted end is mounted an armature such as 199, and each actuator armature coöperates with a type-actuator electro-magnet such as 12$^f$ (Fig. 9) mounted upon the rear side of the main frame plate with the polar ends of its cores projecting forwardly through the frame plate and presented toward the armature. The actuator armatures are staggered in correspondence with the staggered relation of the pivot lugs of their respective type-bar actuating levers while the actuator magnets are also staggered in correspondence to the staggered arrangement of the armatures. In order to attain compactness of assemblage of the actuator magnets they are constructed in a special form having unusually small lateral dimensions. Each magnet comprises three parallel magnetic bars or cores disposed in the plane of movement of its type-bar actuator and projecting from a common narrow back iron such as 193 forwardly through the main frame plate upon which the magnets are mounted. The single coil such as 12$^f$ of each magnet is mounted upon its central bar 198 as a core, while the outer magnetic bars 192 lie close to the periphery of the coil.

The back irons of the staggered sets of type-actuator magnets interlap at their adjacent ends and upon the interlapping ends of the back irons of either set of type-actuator magnets is mounted an arc-shaped insulating plate such as 197, and upon the upper side of the rear faces of these insulating plates is mounted a single arc-shaped conductive bus-bar 196 which is co-extensive with the arcs of both the insulating plates. Upon the lower sides of the rear surfaces of the insulating plates are mounted a number of insulated binding screws 195, one for each type-actuator magnet, while each type-actuator magnet also has a corresponding binding screw such as 194 mounted beside its corresponding insulated binding screw, but inserted in the common bus-bar 196 in lieu of the insulating plate. Each of the type-actuator magnets has its opposing terminals connected to its corresponding binding screws inserted in one of the insulating plates or in the common bus-bar, and separate lead wires such as 12$^e$ (Fig. 9) are connected to the insulated binding screws of the individual actuator magnets and are thus connected with the corresponding terminals of the magnets, while the opposing terminals of all the magnets are connected to the common bus-bar 196 through their corresponding bus-bar binding screws. An extra binding screw 374, inserted in the rear face of the common bus-bar at its medial point between the two insulating plates, serves as a connection for two lead wires 371 and 371$^a$ leading respectively to the ribbon feed magnets 207 and 207$^a$, as will hereinafter be more fully described.

When any one of the type-actuator magnets is energized, its magnetic attraction draws its corresponding actuator armature rearwardly toward the magnet, thus swinging its corresponding type-bar actuating lever rearwardly toward the main frame plate 115 and forcing the upper or cam-engaging end 188 of the actuator rearwardly against the cam surface 189 of its corresponding type bar and toward the pivotal center 181 thereof. The resulting pressure of the cam-engaging end of the actuator upon the cam surface of the type bar forces the type bar to swing upwardly about its pivotal center and thus carry its type proper or record marker proper 183 into striking or printing position at the common striking or printing center of the set of type bars to which it belongs. When thus actuated the type proper strikes upon the front face of a record ribbon 178, which is held in front of the card hopper in a manner which will be more fully described hereinafter. The type strikes the ribbon at the common printing or striking center of the set to which the type belongs and, providing the record card is in position in the card hopper behind the ribbon, presses the ribbon forcibly forward against the card and imprints a record. Although the impulse with which the type bar is actuated by its actuating lever is sufficient to carry its type with forcible impact against the ribbon, the cam surface of the type bar is so formed as to permit it to rebound immediately and carry its type proper out of engagement with the ribbon or at least out of striking position in which the type presses the ribbon against the card, and such recoil of the type bar is assisted by its retractive spring 182. When the type-actuator magnet is again deënergized the force of the type-bar retractive spring 182 is sufficient to swing the type bar back to its normal position while its cam surface simultaneously forces its corresponding actuating lever also back to normal position, which is determined by a stop screw such as 187 against which the actuating lever strikes upon its return stroke and which is inserted in the hand-shaft bracket 169. A separate stop screw 187 is of course provided for each type-bar actuating lever, the two stop screws nearest the middle of the shaft bracket being mounted in its depending medial lug, the lower end of which is mounted upon the medial shaft-bracket stud 167 projecting from the front face of the frame plate, while the other stop screws are inserted in lateral arc-shaped extensions of the shaft bracket which are provided for the purpose and which at their outer ends are mounted upon the shaft-bracket studs 170 also projecting from the front face of the frame plate and, as already noted, serving the additional purpose of securing the lower card-hopper guide-bar 78 to the frame plate.

The record ribbon or printing ribbon 178 is stretched, and is fed, horizontally just in front of the lower guiding webs 77$^d$ of the card hopper and just in front of the card-receiving space between such guide webs, and hence just in front of the time card when the latter is in its record-receiving position in the card hopper. At its right and left ends the ribbon is wound upon suitable ribbon-feeding spools or bobbins 226 and 226$^a$ respectively. The right ribbon spool 226 is fixedly mounted upon a spindle 253. A feed ratchet 227 is also fixedly mounted upon the spindle just below the ribbon spool and the spindle is journaled just below the feed ratchet in the journal boss or lug 286 of an upper spindle bracket 213 mounted upon the front face of the frame plate. At its lower end the spool spindle 253 is supported upon an adjustable conical step bearing constituted in the bearing screw 257 inserted upwardly through the outer end of the L-shaped lower spindle bracket 258 also mounted upon the front face of the frame plate and directly below the upper spindle bracket 213. The spool spindle 253 is provided with a screw thread or worm 254 between its upper journal bearing and its lower step bearing. The feed ratchet is actuated by a drive pawl 221 pivotally mounted upon a pivot stud 224 inserted in the forward or swinging end of a rock arm 119, which swings in a horizontal plane and which is rigidly secured by means of a set screw 252 upon, and near the upper end of, a vertical rock shaft 118, which is in turn pivotally mounted at its upper and lower ends, respectively, in suitable journal lugs 116 and 117 mounted upon the rear face of the frame plate. From its point of connection to the vertical rock shaft, the rock arm 119 extends forwardly through an aperture 300 in the frame plate. The drive pawl 221 is provided with a pawl-engaging spring 220 fixedly inserted in the outer or front edge of the pawl and at its free end bearing on the rear side of a bushing 217 mounted upon a reversing-rod extension of the upper spindle bracket 213, which extends forwardly beyond its journal lug. This bushing is mounted on a stud 216 inserted into the top of this reversing-rod extension of the bracket and, together with the bushing, serving to support and guide the ribbon-feed reversing rod 209, which will later be described. The drive pawl extends leftward from its pivotal stud 224 and it is the leftward stroke of the drive pawl which is its driving or ribbon-feeding stroke. When the pawl is carried to its extreme right position by the rightward swinging movement of its rock arm 119, the drive tooth 222 on the free or driving end of the pawl is forced by its pawl-engaging spring 220 rearward toward the toothed periphery of the ribbon-feed ratchet 227 and the drive tooth 222 of the pawl engages with the teeth of the ratchet. As the pawl is forced to leftward upon the return or leftward movement of its rock arm, the drive tooth of the pawl impels the ratchet wheel and feeds the ribbon during a portion of such return stroke, but during the latter portion of the return stroke a pawl-disengaging cam surface 223, formed upon the free or driving end of the pawl, comes against a vertical disengaging pin 214 inserted in the top of the reversing-rod extension of the upper spindle bracket 213 and as the inclined cam surface is forced against the disengaging pin, the drive pawl is withdrawn from position of engagement with the ratchet-wheel so that its drive tooth is entirely clear of the ratchet teeth.

A horizontal magnetic rock arm 120 is fixedly mounted upon the vertical rock shaft 118 near the lower end thereof and extends from the rock shaft leftward in substantial parallelism with the frame plate. This magnetic rock arm 120 constitutes the armature of the right-hand ribbon-feeding magnet 207, which is mounted upon the front face of the frame plate with the polar ends of its cores projecting rearwardly through the frame plate and presented toward the magnetic rock arm. When this magnet is energized the rock arm is attracted toward the magnet, thus swinging the rock shaft 118 so as to swing its upper or ratchet-driving rock arm 119 to its extreme rightward position, in which position the drive pawl effectually engages the ribbon-feeding ratchet 227. When the ribbon-feeding magnet is deënergized the magnetic rock arm 120 is retracted by means of a retractile helical tension spring 269, the moving end of which is connected to a pin 268 depending from the swinging end of the magnetic rock arm while the opposite end of the retractile spring is anchored to a pin 299 (Fig. 12) inserted in, and extending horizontally rightward from, the horizontal bell-stud 274 inserted in the rear face of the frame plate and bearing the right-hand record indicating bell 298.

The bell-tappet is mounted to swing pivotally near the frame plate in a horizontal plane and about a pivot screw 273 inserted in the upper side of the horizontal bell-stud 274. The tappet consists of a striking arm 280 projecting leftward just in front of the rim of the bell and a shorter arm 271 projecting rightward and just in front of a small tappet-actuating finger 270 formed upon the swinging end of the magnetic rock arm 120. A recoil spring 272 is mounted, by suitable screws or rivets such as 279, upon the rear side of the striking arm 280 of the bell-tappet near its extreme end, and thence follows the contour of the tappet rightward to a point beyond its pivotal mounting and thence extends parallel with the shorter arm of the bell-tappet to a point behind the tappet-actuating finger 270 so that the finger comes between the free end of the recoil spring 272 and the shorter arm of the bell-tappet. When the magnetic rock arm 120 is attracted by its magnet 207, the tappet-actuating finger 270 of the rock arm kicks the shorter arm 271 of the bell-tappet forward, thus throwing its longer or striking arm 280 rearward into contact with the rim or periphery of the right-hand record indicating bell 298. However, the absolute movement of the bell-tappet, which is positively effected by movement of the magnetic rock arm 120, is not sufficient to bring the striking arm of the tappet into impact with the bell, such impact being effected by the momentum of the bell-tappet which causes it to bend its recoil spring and continue its pivotal stroke until its striking arm does make contact with the bell, thus producing a signal indicating, as will be hereinafter more fully pointed out, that the time card placed in the card hopper has received its record. After the impact of the striking arm of the bell-tappet with the bell rim, the recoil spring 272 effects an immediate recoil of the striking arm away from the bell so that it may not interfere with the vibration thereof.

The rearward or retractive movement of the magnetic rock arm 120, as effected by its retractile spring 269, returns the bell-tappet to its normal position by moving the tappet-actuating finger 270 rearwardly against the recoil spring 272 of the bell-tappet, and such retractive movement of the magnetic rock arm also rocks its vertical rock shaft 118 so as to impel its ratchet-driving rock arm 119 leftward through its driving stroke, or stroke in which its ratchet-driving pawl 221 impels the ratchet wheel, and thus turns the vertical spindle 253 and its ribbon spool 226 so as to wind up or feed the record ribbon 178 in a manner which will be more fully set forth hereinafter.

A round vertical guide-bar 264 is secured at its upper and lower ends to the upper and lower spindle brackets 213 and 258, respectively, of the right-hand spool spindle 253, the guide-bar being parallel with the spool spindle and located just in rear of its threaded portion 254. A slotted traveler 259 is interposed between the guide-bar and the threaded portion of the spindle and has a threaded slot in its front edge which receives and meshes with the threaded portion of the spool spindle, while another slot 261 in the rear side of the traveler receives or straddles the guide-bar 264, the guide-bar slot being of such width that its side walls fit against the guide-bar but with sufficient looseness to afford free movement of the traveler. A flat spring 260 is secured in the bottom of the guide-bar slot and parallel with the guide-bar and with its ends pressing against the front side of the guide-bar so as to press the traveler forward against the threaded spool spindle and keep the threads of the traveler in mesh with those of the spindle. As the spindle 253 of the right-hand ribbon spool 226 rotates in the direction in which it is impelled by its driving pawl 221, the traveler 259 is gradually moved by such rotation of the spindle upward along its guide-bar and the threaded portion of the spindle with which it engages. When the rotation of the spindle is reversed the movement of the traveler is of course reversed and the traveler is carried downward along its guide-bar and the threaded spindle. A small switch-actuating roller 263 is mounted just behind the guide-bar and between the channel walls of the guide-bar slot of the traveler and upon a pivot pin inserted through and secured in such channel walls.

The T-shaped switch lever proper 232 of the ribbon-feed reversing switch and the traveler-actuated T-shaped lever 237 thereof are mounted side by side upon a common horizontal pivotal shaft 230 secured at its ends in two small L-shaped brackets 228 mounted upon the front face of the frame plate. These levers of the ribbon-feed reversing switch are located in rear of the traveler 259. The traveler-actuated lever 237 is on the left of the switch lever proper 232 and both the levers are located approximately in rear of the traveler 259 and with their arms corresponding to the cross-bar of the T in approximately vertical positions. The traveler-actuated switch-actuating lever 237 comprises two opposed traveler-engaging arms 237 and 238 extending respectively upward and downward from the hub 236 of the lever and constituting the cross-bar of the T. These arms swing in a vertical plane about the horizontal pivotal axis of the lever and are provided with forwardly inclined ends each of which, when swung to its forward or front position, intersects the path of movement of the switch-actuating roller 263 so as to be engaged and forced rearward by the roller in its rectilinear movement as effected by the rotation of the threaded spindle in its traveler. An approximately horizontal spring arm 241, constituting the stem of the T, extends from the hub 236 of the T-shaped switch-actuating lever rearwardly through an aperture 266 in the frame plate. This arm swings within angular limits at equi-angular distances above and below the horizontal plane of the pivotal shaft 230 of the lever. A flat S-shaped positioning compression spring 242 is interposed between the rearmost or swinging end of the spring arm 241 and the end of an adjustable spring-abutting screw 243, which is inserted in a suitable spring bracket 121 mounted upon the rear face of the frame plate. The resistance to compression, or the extensible effort of the spring, resolves into a rectilinear force-resultant extending directly from the end of the spring-abutting screw 243 to the swinging end of the spring arm 241. When the spring arm is in exactly horizontal position, the projection of this rectilinear force-resultant passes through the axis of rotation of the spring arm so that the latter is at that instant in its dead center position as regards transmission of rotative moment from the positioning spring to the spring arm and its switch-actuating lever, but the instant that the spring arm passes either above or below its horizontal or dead center position the rectilinear force-resultant of the positioning spring 242 projects respectively either above or below the pivotal axis of the spring arm 241 and its switch-actuating lever so as to develop, respectively, either upward or downward rotative moment upon the spring arm and entire lever and consequently causes the spring arm to move either upward or downward about its pivotal axis and rotate the switch-actuating lever 237 together with its roller-engaging arms.

The T-shaped switch lever proper 232 is similar in general form to the traveler-actuated switch-actuating lever 237 and comprises opposed contact arms 232 and 233 extending upwardly and downwardly from its pivotal hub 229 and together constituting the cross-bar of the T. These contact arms are disposed to the right of the roller-actuated arms of the switch-actuating lever 237 and are substantially parallel with such roller-actuated arms. Upper and lower kick pins 239 and 240 are inserted in and extend horizontally rightward from the forwardly inclined roller-engaging ends of the traveler-actuated arms of the switch-actuating lever, and these kick pins extend in front of the upper and lower contact arms of the switch lever proper so that when the switch-actuating lever is thrown in one direction or the other its kick pins engage one or the other of the contact arms of the switch lever proper so as to throw the latter in the direction corresponding to the throw of the switch-actuating lever. A spring arm 231, constituting the stem portion of the T-shaped switch lever proper, extends rearward through an aperture 265 in the frame plate, and this spring arm 231 coöperates with a positioning spring 234 interposed between the rear end of the spring arm and an adjustable spring-abutting screw 235 mounted in the same spring bracket 121 which carries the spring-abutting screw 243 of the other positioning spring. The positioning spring 234 coöperates with the switch lever proper 232 in the manner already described with reference to the action of the positioning spring 242 upon its switch-actuating lever, the only difference being that the spring arm 231 of the switch lever proper is shorter than the spring arm of the switch-actuating lever while the positioning spring 234 of the switch lever proper is larger than that of the switch-actuating lever. Both positioning springs tend to retain their respective levers in either of their extreme positions, the retentive force of the larger positioning spring 234 operating upon the shorter spring arm 231 of the switch lever proper being less than the retentive force of the positioning spring 242 of the switch-actuating lever.

When the T-shaped switch lever proper is in either one or the other of its extreme angular positions, either its upper contact arm 232 or its lower contact arm 233 make contact respectively either with an upper pair of contact springs 244ᵃ or with a lower pair of contact springs 244. These upper and lower pairs of contact springs project forwardly through frame-plate apertures 250 and 251 respectively and are respectively mounted in upper and lower metallic spring blocks 245ᵃ and 245 supported respectively upon insulating plates 248ᵃ and 248 secured respectively to upper and lower L-shaped brackets 249ᵃ and 249, which are mounted upon the rear face of the frame plate. The upper and lower contact blocks 245ᵃ and 245 respectively are secured to their respective insulating plates by respective pairs 246ᵃ, 247ᵃ, and 246, 247, of fastening bolts, the outer or rearmost fastening bolts 247ᵃ and 247 of the pairs being made extra long to serve as binding posts for connecting wires 111 and 112 and being provided for this purpose with extra nuts on their threaded ends which project through their respective insulating plates.

As the record ribbon or printing ribbon 178 is unwound from the right-hand ribbon spool 226 (this being the phase of operation represented in Figs. 14 and 16), and as the threaded spool spindle 253 is rotated in consequence, its switch-actuating traveler 259 is moved gradually downward until the switch-actuating roller 263 carried thereby engages the forwardly inclined end of the lower roller-actuated arm 238 of the switch-actuating lever. After such engagement occurs the further downward movement of the switch-actuating roller gradually forces the lower roller-actuated arm of the lever rearward against the resistant retentive effort of the positioning spring 242 and until the lever passes its position of dead center relation to such spring. Whereupon the switch actuating lever is immediately forced by its positioning spring to its opposite extreme angular position in which its opposite or upper roller-actuated arm 237 projects forwardly into the upward path of the switch-actuating roller. As the switch-actuating lever is thus suddenly thrown over by the combined actions of the switch-actuating roller and the positioning spring 242, the lower kick pin 240 in its rearward movement engages the lower contact arm 233 of the switch lever proper and kicks the switch lever proper into its opposite extreme angular position so as to break contact between its upper contact arm 232 and upper coöperating contact springs 244ᵃ and make contact between its lower contact arm 233 and lower coöperating contact springs 244. This exchange of contact ruptures conductive connection from the upper contact springs 244ᵃ to the frame plate 115 by way of the switch lever proper, and makes conductive connection between the lower contact springs 244 and the frame plate by way of such switch lever proper. In accordance with circuits and connections, which will be fully described hereinafter, this exchange of frame plate connection from the upper pair of contact springs 244ᵃ to the lower pair of contact springs 244 throws out of operation the left-hand ribbon-feeding magnet 207ᵃ, which up to this moment has been actuating the left-hand ribbon spool 226ᵃ so as to wind up the record ribbon thereon while unwinding it from the right-hand spool 226, and such exchange of connection also throws into operation the right-hand ribbon-feeding magnet 207 which actuates the right-hand ribbon-feeding ratchet 227 and right-hand ribbon-feeding spool 226, this right-hand ribbon-feeding magnet 207 having been out of circuit during non-connection between the contact springs 244 and their coöperating contact arm 233. Now, however, the right-hand ribbon-feeding magnet 207 is operative and at the proper instant is energized to attract its magnetic rock arm 120, which, upon being retracted by its retractile spring 269, swings its rock shaft 118 and the right-hand ratchet-driving arm 119 and ratchet-driving pawl 221 in ratchet-driving or ribbon-feeding direction, so as to wind up the record ribbon upon the right-hand ribbon spool 226 and reverse the rotative direction of its spool spindle 253. Upon such reversal of rotation of the spool spindle 253 the rectilinear movement of its traveler is reversed and the traveler is carried upward until its switch-actuating roller 263 engages the upper roller-actuated arm of the switch-actuating lever and reverses the angular position of both the switch-actuating lever and the switch lever proper and in a manner exactly reverse to that which has already been described.

The left-hand ribbon-feeding spool 226ᵃ and all its accessory and coöperating members are left-hand counterparts of the right-hand ribbon spool 226 and its accessory and coöperating members, excepting that the spool spindle 253ᵃ of the left-hand ribbon spool is not continued downward below its spindle bracket 213ᵃ corresponding to the upper spindle bracket 213 of the right-hand spool spindle, the left-hand spool spindle 253ᵃ having no threaded portion nor lower spindle bracket, since it is not required to actuate a traveler and reversing switch mechanism such as those of the right-hand spool spindle. The left-hand counterparts of the various already-described members or elements of the right-hand portion of the ribbon-feeding mechanism are marked with the same numerical reference characters supplemented by an exponential "a", and comprise the ribbon-feed magnet 207ᵃ, its coöperating magnetic rock arm 120ᵃ, the vertical rock shaft 118ᵃ, a ratchet-feeding rock arm 119ᵃ, ratchet-feeding pawl 221ᵃ, ribbon-feeding ratchet 227ᵃ, ribbon-feeding spool 226ᵃ, etc., etc. The left-hand portion of the ribbon-feeding mechanism also comprises a record indicating bell 298ᵃ mounted upon a bell-stud 247ᵃ bearing a pivotal bell-tappet 280ᵃ coöperating with the magnetic rock arm 120ᵃ in the manner already described with respect to the right-hand bell striking mechanism. In Fig. 12 the bell 298ᵃ is omitted from the left-hand bell mechanism (that is, the mechanism on the left-hand side as looking from in front of the recording mechanism, but on the right-hand as looking toward this figure from the rear of the mechanism), the position of such left-hand bell 298ᵃ being indicated by a broken line corresponding to its circumference and the bell-stud 247ᵃ being shown in section on a plane just in rear of the bell-tappet, the object being to clearly illustrate the relative and coöperative arrangement of the elements of the bell-striking mechanism.

The medial points between the upper and lower flanges on the right and left ribbon spools have the same elevation as the striking or printing centers of the type bars, and the record ribbon winds upon, or is unwound from, the rear sides of the opposing spools and extends horizontally from one spool to the other and in front of the card-hopper and with its medial line passing through the striking or printing centers of the type bars. For instance, tracing the path of the printing ribbon from its right spool 226 leftward to its left spool 226ª, it passes tangentially leftward off from the rear side of the right-hand spool 226, thence behind the right-hand ribbon-guiding roller 177 rotatably mounted upon a roller-stud 255 inserted in the tip of a horizontal bracket lug 176 extending forwardly underneath the ribbon and formed integral with a mounting plate 177ᵇ secured upon the front surface of the main frame plate 115. Thence the ribbon passes leftward through a ribbon guide 174 made of sheet-metal in the form of a channel U-shaped in cross-section and having its rear wall extending rightward and constituting a horizontal arm 174ª which supports the U-shaped ribbon guide and which is in turn mounted upon the front face of the mounting plate 177ᵇ of the right-hand guide-roller bracket 176, the supporting arm 174ª being fastened by the same screws which secure the mounting plate upon the main frame plate. From the right-hand U-shaped ribbon guide, the ribbon extends leftward through the common striking or printing centers of the type bars and through a corresponding left-hand U-shaped ribbon guide 175, which is the left-hand counterpart of the ribbon-guide 174 and which is correspondingly mounted upon the front face of the mounting plate of the left-hand guide-roller bracket 176ª, which is the left-hand counterpart of the right-hand guide-roller bracket 176 and which similarly supports the left-hand ribbon-guiding roller 177ª. From the left-hand guide roller 177ª the ribbon extends leftward tangentially to the left-hand ribbon spool 226ª.

The ribbon-feed reversing rod 209 is a flat horizontal bar extending from the right-hand upper spindle bracket 213 of the right-hand ribbon spool to the left-hand spindle bracket 213ª of the left-hand ribbon spool, and mounted at its right and left ends respectively upon the bushings 217 and 217ª set upon the upper sides of the reversing-rod extensions of such spindle brackets and secured by means of guide screws 216 and 216ª respectively inserted through longitudinal guide slots 215 and 215ª respectively formed in the reversing rod near its right and left ends. The heads of the reversing-rod guide screws 216 and 216ª overlap their respective guide slots 215 and 215ª, so as to secure the ribbon-feed reversing rod to the guide screws while permitting it to slide freely the entire length of its guide slots. Right and left feed-ratchet-retaining spring pawls 210 and 210ª respectively are mounted near the right and left ends of the ribbon-feed reversing rod 209 and extend from its rear edge horizontally rearward toward the toothed peripheries of the right and left ribbon-feeding ratchets 227 and 227ª respectively. Right and left shift pins 218 and 218ª depend respectively from the right and left ends of the reversing rod and in positions respectively on the right and on the left of their respective cooperating shift fingers 219 and 219ª, which are fixedly mounted upon and which project forwardly from the free or swinging ends of the right and left ratchet-driving rock arms 119 and 119ª respectively. The shift pins and their cooperating shift fingers are so positioned that the initial movement of either the right or the left shift finger 219 or 219ª, as effected by energization of either the right ribbon-feed magnet 207 or the left ribbon-feed magnet 207ª, brings either the right or the left shift finger 219 or 219ª into engagement with its cooperating shift pin so as to shift the reversing rod 209 either to its extreme right or to its extreme left position. The right and left spring-retaining pawls 210 and 210ª are so positioned upon the reversing rod 209 that when the latter is in its extreme right position the right spring-retaining pawl 210 will be in engagement with the right ribbon-feed ratchet 227 so as to prevent any backward or unwinding rotation of its ribbon spool 226, while the left spring-retaining pawl 210ª will be out of engagement with the left ribbon-feed ratchet 227ª so as to permit its ribbon spool 226ª to be turned backward in the direction for unwinding the record ribbon therefrom. And reversely, when the ribbon-feed reversing rod 209 is in its extreme left position, its right spring-retaining pawl 210 will be out of engagement with the right ribbon-feeding ratchet 227 while its left spring-retaining pawl 210ª will be in position of engagement with the left ribbon-feeding ratchet 227ª. Right and left reversing-rod retaining springs 211 and 211ª are secured on the under sides of the reversing-rod extensions of the right and left spindle brackets 213 and 213ª, by means of nuts such as 284 (Fig. 14) screwed upon the lower ends of the right and left guide-screws 216 and 216ª which project below the spindle brackets in which they are respectively mounted. From their mountings these retaining springs project upwardly to the elevation of the reversing rod and thence project respectively leftward and rightward toward the center of the mechanism and in parallelism with the front edge of the reversing-rod and terminate in V-shaped bended ends adapted to enter respectively right and left V-shaped retaining notches 305 and 305ª in the front edge of the reversing rod. The reversing-rod retaining springs and their cooperating V-shaped retaining notches are relatively positioned so that when the retaining rod is in its extreme right position the V-shaped end of the right retaining spring 211 springs into its cooperating retaining notch 305 so as to retain the reversing rod in such right-hand position until it is forcibly moved therefrom, while the left-hand retaining spring 211ª reversely operates to enter its corresponding retaining notch 305ª when the reversing rod 209 is in its extreme left position and thus to retain such reversing rod in such left-hand position until it is forcibly moved therefrom.

As has already been pointed out, the position of the ribbon-feeding reversing switch 232 determines which ribbon-feed magnet shall be effectually in circuit and shall be energized at any given printing or recording operation of the recording mechanism, and at no time can both the right and left ribbon-feed magnets 207 and 207ª operate together. It will be noted that the initial energization of the left ribbon-feed magnet 207ª and the consequent movement of its magnetic rock arm 120ª and rock shaft 118ª, ratchet-driving rock arm 119ª and reversing-rod shift finger 219ª, causes the ribbon-feed reversing rod 209 to be shifted to its extreme left-hand position and thus disengages its right-hand ratchet retaining pawl 210, while bringing its left-hand ratchet retaining pawl 210ª into operative engagement with the left-hand ribbon-feed ratchet. It will be apparent, therefore, that upon the return or ratchet-driving stroke of the ratchet-driving arm 119ª, and its ratchet-driving pawl 221ª the left-hand ribbon-feeding ratchet 227ª will be actuated in the direction required to wind up the ribbon upon its ribbon-feeding spool 226ª, while the consequent feeding movement of the record ribbon will partially unwind the same from the right-hand ribbon spool 226 and thus cause such right-hand ribbon-spool to rotate in unwinding direction, which is now permitted by virtue of the disengagement of the right-hand ratchet retaining pawl 210. After such initial operation of the left-hand ribbon-feed magnet 207$^a$ and its coöperating ribbon-feeding members, the ribbon-feed reversing rod 209 will be retained in its left-hand position by its left-hand retaining spring 211$^a$ and during all the successive similar operations of the left-hand ribbon-feed magnet and the ribbon-feeding members which it actuates and until the continued winding up of the record ribbon upon the left-hand ribbon spool and the consequent unwinding of such ribbon from the right-hand ribbon spool shall have rotated the right-hand spool and its threaded spindle 253 a sufficient number of revolutions to carry the spindle-actuated switch-actuating traveler 259 downward into the position in which it effects a reversal of the ribbon-feed reversing switch 232. Thereupon such ribbon-feed reversing switch will be reversed so that the next printing or recording operation of the mechanism will cause the right-hand ribbon-feed magnet 207 to be energized and to swing its right ratchet-driving rock arm 119 to extreme rightward position and thus shift the ribbon-feed reversing rod 209 to its extreme right-hand position so as to disengage the left-hand ratchet retaining pawl 210$^a$ while bringing the right-hand ratchet pawl 210 into engagement with its ratchet. Upon the return or driving stroke of the ratchet-driving rock arm 119 the right-hand ribbon-feeding ratchet 227 will be actuated to wind up the record ribbon upon the right-hand spool, the left-hand ribbon spool being now free, by disengagement of its retaining pawl 210$^a$, to rotate in unwinding direction. Thereafter the right-hand ribbon-feed magnet and its coöperating ribbon-feeding members will be similarly actuated at each operation of the recording mechanism until the threaded spool spindle 253 has rotated in winding up direction a sufficient number of revolutions to carry its coöperating switch-actuating traveler up to its upper switch-reversing position. Whereupon the ribbon-feed reversing switch will be again reversed and whereafter the left-hand ribbon-feed magnet 207$^a$ will come into operation and with its initial energization and actuation of its ribbon-feeding mechanism will again shift the ribbon-feed reversing rod 209 to left-hand position so as to again permit unwinding rotation of the right-hand ribbon spool, while bringing the left-hand ratchet-retaining pawl 210$^a$ again into operative engagement with the driving ratchet of the left-hand ribbon-feeding spool. Thus the direction of feeding the record ribbon or printing ribbon is reversed periodically and indefinitely.

The electrically-controlled clock movement or sub-movement, contained in the upper or smaller casing 333 of the recording apparatus shown in Fig. 1, constitutes time-controlled selective mechanism which coöperates with the recording mechanism already described to determine which of its type bars and which of its day levers shall operate to mark and locate the record upon a time card which is placed into the card hopper at any given instant and on any given day of the week.

The casing of the sub-movement comprises a baseboard 154 mounted upon the horizontal top-board 140 of the larger or lower casing 332, and comprises a backboard 159 mounted together with suitable side-boards upon the rear and side edges of the base-board 154, and comprises a horizontal top-board 158 mounted upon the upper edges of the back and side boards, and comprises a front-board 155 secured to the front edges of the baseboard, side boards and top board and having a square aperture or window closed by a clock dial 149 mounted on the inner surface of the front board. A swinging window frame 156 is mounted with hinges upon the left-hand side-board of the casing and, when closed, swings against the front side of the front board 155 and around the edges of its square window. The swinging window frame carries a glass pane 157 secured in a suitable rabbet in the inner side of the frame and by means of suitable binding strips or filling strips 156$^a$.

The frame work of the sub-movement consists of front and back frame plates 15 and 27 of the outline indicated in Fig. 4 and rigidly connected by suitable frame bolts and by their lower pair of connecting frame bolts mounted upon four upright legs including a front pair 146 and a back pair 145 standing upon and secured by screws to the base-board 154 of the casing.

The sub-movement comprises left and right main springs or driving springs mounted side by side upon left and right spring arbors 55 and 55$^a$ rotatably mounted between the front and back frame plates and respectively on the left and right sides of the frame. The left driving spring 37 is shown in Fig. 7, and since this spring and its accessory gears and other members are left-hand counterparts of the right driving spring and its accessory members, it will be sufficient to describe the left-hand driving spring 37 and its coöperating gears and other accessory members. This spring 37 is of the usual spiral form secured at its inner end to the spring arbor or winding spindle 55 and anchored at its outer end to the left-hand lower frame bolt. The spring is wound by left-hand rotation of its spring arbor 55, which latter carries a toothed ratchet 38 engaging with a ratchet-pawl, not shown in the drawings but pivotally mounted in a well-known manner upon the spring gear 36, within which the spring arbor turns freely. After being wound, the spring impels the spring arbor in right-hand direction, the spring arbor rotates its ratchet 38 and the latter impels the spring gear 36 in right-hand direction and through intermediation of the ratchet-pawl mounted upon the spring gear 36 and engaging with the ratchet-wheel. The left-hand spring gear 36 meshes with an intermediate pinion 35 mounted upon a suitable shaft in the middle of the mechanism and also meshes with the right-hand spring gear 36$^a$ on the right of the intermediate pinion. Fixedly mounted upon the same shaft with the intermediate pinion 35 is the common spring driven gear 34. Both the left and right driving springs, through their spring gears 36 and 36$^a$ respectively, impel their intermediate pinion 35 and its attached gear 34 in left-hand direction of rotation, and the common spring-driven gear 34 meshes with the main pinion 33 mounted upon the main spindle or minute-hand spindle 42 of the sub-movement and impels such main pinion and main spindle of the sub-movement in right-hand direction. A gear 32, also mounted upon the minute-hand spindle 42 and fixedly secured to the main pinion 33, meshes with and leftwardly impels the pinion 31 and its attached gear 30, which latter meshes with and rightwardly impels an intermediate pinion 29 in turn meshing with and leftwardly impelling the gear 14 fixedly mounted upon the escapement spindle or shaft 152 and meshing with the pinion 17 fixed upon the shaft of the retardation fan-wheel 16 disposed at the right of the escapement spindle. The escapement spindle 152 carries the escapement disk 17, in the front face of which are inserted the outer and inner escapement pins 18 and 19, the outer pin 18 being located at a greater radial distance from the escapement spindle than the inner escapement pin 19. A magnetically-actuated escapement lever 21 is pivotally mounted upon a suitable pivot pin 25 inserted through or across a slot in the outer or leftward end of a non-magnetic magnet bracket 23 extending horizontally leftward from the top of the movement frame. The slot in the leftward end of the magnet bracket receives the pivoted end of the escapement lever 21 which fits the slot tightly enough to maintain the escapement lever in its proper plane of pivotal movement. From its point of pivotal mounting the escapement lever extends rightward above the magnet bracket and toward the escapement disk and carries a flat retraction spring 21ª, one end of which is secured in the lower edge of the escapement lever and the other end of which presses downward upon the upper surface of the magnet bracket and tends always to raise the escapement lever 21 to its uppermost or normal position in which it is stopped, as shown in Fig. 4, by the engagement of the inner edge of its pivoted end against the inner edge of the slot in which such pivoted end of the lever is mounted. The escapement magnet 28 comprises two coils mounted on the under side of the non-magnetic magnet bracket 23 by means of their magnetic cores which project upwardly through and are secured in the non-magnetic magnet bracket. The upper ends of the cores of the escapement magnet 28 are presented toward a magnetic armature 24 carried by the escapement lever 21 and mounted upon its lower edge just above the polar ends of the cores. The escapement magnet is normally deenergized, but when it is energized for a moment the armature 24 of the escapement lever is attracted toward the poles of the magnet and the escapement lever is thereby swung downward about its pivotal center 25 and against the retractive effort of the flat spring 21ª and thus causing the extreme right or swinging end of the lever to swing downward. This swinging end of the lever carries a stop pin 20 which, when the lever is in its uppermost or normal position, intersects the orbit of rotation of the outer escapement pin 18 carried by the escapement disk so as to engage such outer escapement pin and arrest its movement, while the same stop pin 20, when the lever is swung by magnetic attraction to its lowermost position, intersects the orbit of rotation of the inner escapement pin 19 so as to engage the latter and arrest its movement. The escapement disk being under constant rotative moment from the train of gears impelled by the two driving springs, it will be apparent that immediately upon energization of the escapement magnet 28 and consequent downward movement of the swinging end of its escapement lever, the stop pin 20 of the lever will pass below its position of engagement with the outer escapement pin 18 so that the latter will be free to move and the escapement disk will rotate until its escapement pin 19 comes into engagement with the stop pin 20 and is stopped thereby. In the particular instance illustrated, the escapement pins 18 and 19 are separated only by a short angular distance so that this initial movement of the escapement disk is comparatively small. Immediately upon deënergization of the escapement magnet 28, its escapement lever 21 is returned by retractive effort of the spring 21ª to normal position in which the stop pin 20 of the escapement lever again intersects the path of rotation of the outer escapement pin 18. Upon such retractive movement of the escapement lever and its stop pin, the inner escapement pin is released and the escapement disk again moves under stress of the driving springs until its outer escapement pin 18 again engages and is arrested by the stop pin 20.

The main pinion 33 normally drives the main spindle or minute-hand spindle 42 in right-hand direction and through a detachable hand-setting clutch comprising a pinion collar 39 fixedly secured to the main pinion 33 and a spindle collar 40 fixedly secured upon the minute-hand spindle 42. If it is desired the pinion collar 39, the main pinion 33 and its attached gear 32 may all be mounted upon and fixedly secured to a common sleeve loosely fitting the minute-hand spindle. At all events, both the pinion collar 39 of the clutch and the gear 32 must be fixedly secured to the main pinion 33. The adjacent faces of the pinion collar 39 and the spindle collar 40 of the clutch are provided with interlocking serrations, and a helical compression spring 41 surrounds the minute-hand spindle and is interposed between the rear frame plate 27 and the spindle collar 40 of the clutch so as to normally force such spindle clutch-collar forward and hold it normally in engagement with its coöperating pinion clutch-collar so as to lock the minute-hand spindle to the main pinion 33. The forward end of the minute-hand spindle 42 projects through a central hole in the clock dial 149, and upon the extreme forward end thereof is mounted the minute-hand proper $m'$ of the sub-movement, such minute-hand proper being secured by means of a thumb nut 151, which also serves as a gripping head in manually setting the hands of the sub-movement. The initial pinion 50 of the reduction train of the hour-hand proper $h'$ is fixedly mounted upon the minute-hand spindle just in front of the front frame plate 15 and meshes with the reduction gear 51 turning upon a suitable stud projecting forwardly from the front face of the front frame plate and fixedly secured to the reduction pinion 52 turning upon the same stud and meshing with the hour-hand gear 53 mounted upon the rear or inner end of the hour-hand sleeve 150, which turns freely upon the minute-hand spindle 42 and projects forwardly through the central hole in the clock dial and carries the hour-hand proper $h'$ secured upon its extreme forward end which terminates just behind the minute-hand proper $m'$. A calendar cam 54 is fixedly mounted just behind the hour-hand gear 53 and upon the extreme rear end of the hour-hand sleeve 150 which projects rearwardly or inwardly a short distance beyond such gear. The purpose and operation of the calendar cam will be described hereinafter.

A circular commutator dial 49 of insulating material is mounted in rear of the sub-movement and upon suitable brackets such as 153 secured to the rear ends of the frame bolts of the movement. A portion of the rear face of this dial is illustrated in the diagram of Fig. 2. The rear end of the minute-hand spindle 42 projects rearwardly through a central hole in the insulating commutator dial and upon the extreme rear end of the minute-hand spindle. The minute-hand wiper m is secured by means of its hub 48 which carries a set screw abutting against the spindle. The initial pinion 43 of the reduction train of the hour-hand wiper h is fixedly mounted upon the minute-hand spindle 42 just in rear of the rear frame plate 27 and meshes with a reduction gear 44 fixedly secured to a reduction pinion 45 and turning together therewith upon a spindle stud projecting rearwardly from the rear face of the rear frame plate. The reduction pinion 45 meshes with the hour-hand wiper gear 46 fixedly mounted upon the forward or inner end of the hour-hand wiper sleeve 47 which projects rearwardly through the central hole in the commutator dial 49 and upon its rear end carries the hour-hand wiper h fixedly secured to the sleeve and rotating in a plane between the insulating dial 49 and the minute-hand wiper m. The outer end of the hour hand wiper rotates in contact with a succession of arc shaped contact segments such as $12^a$, $1^a$, $2^a$, etc., one for each of the twelve hours and arranged in circumferential order concentric with the axis of the dial and collectively designated as the hour set of contact segments. Once during each revolution the hour hand wiper h makes additional contact with a contact spring 2 mounted upon the rear face of the commutator dial with its contacting end in position to be engaged by the hour hand wiper as it passes from the segment $11^a$ corresponding to the hour eleven to the segment $12^a$ corresponding to the hour twelve, which passage occurs exactly at the end of the twelfth hour, or, in other words, at twelve o'clock either midday or midnight. The outer end of the minute hand wiper m rotates in contact with a minute set of contact segments such as $oo^b$, $5^b$, $10^b$, $15^b$, etc., the segments being arc shaped like those of the hour set and being twelve in number, one for each five-minute interval of the hour and arranged in circumferential order in outer concentricity with the hour set of the contact segments. The hour and minute sets of contact segments constitute selective commutators coöperative with their respective hour hand and minute hand wipers to selectively control or determine the operation of the hour and minute set of type bars respectively, by means of electric circuits selectively controlled by these commutators in a manner which will hereinafter be clearly explained.

The electrically controlled clock movement or sub-movement comprises a calendar mechanism in selective control of the calendar-controlled card-positioning levers or day levers of the recording mechanism, through controlling circuits which will hereinafter be clearly described and which are selectively controlled by the calendar commutator comprised in the calendar mechanism, which will now be described. This calendar mechanism is mounted upon a sub-frame plate 60 disposed in a vertical plane parallel with the frame plates of the sub-movement and secured at its upper end to the front frame plate 15 by means of suitable connecting screws inserted through the upper corners of the sub-plate 60, and further by means of a bolt 58 inserted through the insulating calendar contact board or commutator board 76 and through a bushing 69 and through the upper edge of the sub-plate 60 and thence into and through the front frame plate 15 of the sub-movement, the inner or rear end of the plate being provided with a lock nut. The insulating contact board 76 abuts against the front end of the bushing 69 so that such bushing and the bolt 58 constitute a means for mounting the contact board in parallelism with the sub-frame plate or calendar plate 60 and in front thereof by a distance equal to the length of the bushing. The head of the bolt 58 is countersunk in the front face of the contact board so as to insure against contact between the head of such bolt and the connecting strip or ribbon $Th^2$ mounted upon the front face of the contact board and in front of such bolt.

The inner or rear end of a rotatable hollow ratchet sleeve $65^a$ projects through a bore in the calendar frame plate 60, which bore acts as an inner bearing for the ratchet sleeve, while the outer or front end of the ratchet sleeve $65^a$ projects forwardly through a bushing $76^a$ secured in the contact board 76 and acting as an outer or front bearing for the ratchet sleeve $65^a$. A ratchet 65 is formed integrally upon a collar or enlargement of the ratchet sleeve $65^a$, which collar at its rear end abuts against the front face of the calendar frame plate 60, while its outer end abuts the inner end of the bearing bushing $76^a$. An insulating bushing $65^b$ is fixedly mounted within the hollow ratchet sleeve $65^a$ and has at its front end an integral flange or head $65^c$ overlapping the front end of the hollow ratchet sleeve.

The main spindle 75 of the calendar mechanism passes through and is fixedly secured in the insulating bushing $65^b$, and the countersink head at its outer or front end is countersunk in the center of the circular rotatable calendar dial 147 so as to clamp one end of the rotatable calendar wiper 4, through which the main spindle 75 passes, firmly between the hub or center of the calendar dial and the flanged head $65^c$ on the front end of the insulating bushing. The inner end of the main spindle 75 passes through an insulating washer $65^d$ interposed between the rear end of the hollow ratchet sleeve $65^a$ and the combined clamping and contact nut 74, which is of circular or cylindrical form and which is screwed upon the inner end of the main spindle. Thus the hollow ratchet sleeve $65^a$ and its interior insulating bushing and the main spindle 75 of the calendar mechanism and the calendar dial 147 and calendar wiper 4 upon the front end of the main spindle, as well as the circular nut 74 on the inner or rear end thereof, are all secured fixedly together so as to be rotated by the ratchet 65, although the insulating bushing $65^b$ and the insulating washer $65^d$ effect perfect insulation between the hollow ratchet sleeve or frame work of the mechanism and the main spindle or its calendar wiper 4 or other conductors connected therewith. A spring contact wiper or brush 73 is at one end mounted upon, but insulated from, the sub-frame plate 60, while its other end makes rubbing contact with the periphery of the circular nut 74 screwed upon the main spindle 75, and a conductor 3 is connected with the mounted end of the spring contact brush 73, whereby connection may be had with the cylindrical contact nut 74 and the main spindle 75 and the contact wiper 4.

A series of contact screws $Su'$, $M'$, $Tu'$, $W'$, $Th'$, $F'$ and $Sa'$, are inserted in the front face of the insulating contact board 76 of the calendar mechanism and are disposed at equi-radial distances from the axis of the main spindle 75 and at equi-angular intervals thereabout. These screws are inserted through and bear upon the upper ends of the connecting strips or metallic ribbons $Su^2$, $M^2$, $Tu^2$, $W^2$, $Th^2$, $F^2$ and $Sa^2$, respectively. These connecting strips lie flat upon the front face of the contact board and lead from their respective contact screws to the lower edge of the insulating contact board 76 where their lower ends are connected to respective terminal screws $Su^3$, $M^3$, $Tu^3$, $W^3$, $Th^3$, $F^3$ and $Sa^3$, such terminal screws being inserted through the lower ends of the connecting strips and into the contact board so as to clamp, between the screw heads and the metallic connecting strips, suitable connecting wires such as $Su^4$, $M^4$, $Tu^4$, $W^4$, $Th^4$, $F^4$ and $Sa^4$. As the main spindle 75 of the calendar mechanism is rotated, its contact wiper 4 successively comes into contact with, and wipes over, the heads of the contact screws disposed at equi-angular intervals about the axis of the main spindle. It will be noted that these contact screws are seven in number, corresponding to the seven days of the week.

The periphery of the spiral calendar cam 54, which makes one revolution each twelve hours, is engaged by the upper or swinging end of a cam-actuated calendar-actuating rock arm 56, which is pivotally mounted at its lower end upon a stud 163 inserted in the front face of the sub-plate 60 near the lower edge thereof. A flat retraction spring 61, secured in the edge of the calendar-actuating rock arm 56 and bearing against a stop pin 62 inserted in the upper left-hand corner of the sub-plate 60, tends always to force the actuating rock arm rightward about its pivotal center 163 so as to continuously force its upper or cam-actuated end rightward toward the axis of the spiral calendar cam 54 and against the periphery thereof. Midway between its pivoted and cam-actuated ends, the actuating rock arm 56 carries a pivoted pawl 57 engaging the calendar ratchet 65 so as to drive the ratchet in rightward rotative direction when the actuating rock arm 56 is swung rightward under the impulse of its retraction spring 61. The ratchet-engaging tooth of the calendar-actuating pawl 57 is held in engagement with the toothed periphery of the calendar ratchet 65 by the effort of a flat spring 64 fixed in the edge of the pawl 57 and bearing against a stop pin 63. As the calendar-actuating spiral cam 54 rotates in rightward direction, together with the hour hand sleeve 150, which carries and impels the cam, the cam gradually raises, or forces in leftward direction, the swinging end of the calendar-actuating rock arm 56 until the rock arm has been moved to its extreme left-hand position, which is reached preferably at a few minutes before twelve M. and twelve P. M.; for instance, fifteen minutes before twelve as in the case illustrated in Fig. 4. At this instant the highest point of the spiral cam passes beyond the angle of engagement with the swinging end of the rock arm 56, and the rock arm is immediately thrown back, under impulse of its retraction spring 61, to its extreme right-hand position in which its swinging end engages the periphery of the spiral cam at its point of minimum radius. This retractive movement of the calendar-actuating rock arm carries its ratchet-actuating pawl 57 in rightward or ratchet-impelling direction so as to move the calendar ratchet 65 one step, while the right or free end of the pawl projects under, and is engaged by, the pawl-retaining finger or extension $68^b$ of the calendar setting lever 68 so as to prevent the pawl from being raised by the momentum of the calendar ratchet and its attached parts, thereby preventing such calendar ratchet, its calendar dial, calendar wiper, etc., from being carried by their momentum further than one step of the ratchet through which the parts are positively impelled by the movement of the driving pawl 57. The calendar-actuating ratchet has fourteen teeth and the stopping positions of the ratchet are so adjusted and determined that every alternate or second step or movement of the ratchet rotates the main spindle 75 of the calendar mechanism so as to bring its calendar wiper 4 into a position of contact with one of the calendar contact screws upon the front face of the contact board 76, while the intervening or intermediate steps or movements of the calendar ratchet bring the calendar wiper into non-contacting position.

Now, as the actuating cam makes one revolution in each twelve hours, its calendar-actuating rock arm 56 will make one actuative stroke in each twelve hours, or two strokes in each twenty-four hours, so that at the ends of twenty-four hour intervals the calendar contact wiper 4 will be brought into positions of contact with successive calendar contact screws and will remain in each of such contacting positions during twelve hours, that is to say, until the next actuative stroke of the ratchet takes place. The relative arrangement of the parts of the calendar mechanism is such that the actuative strokes of the actuating rock arm and pawl which bring the calendar wiper 4 into contacting positions, occur at night, and in the illustrative instance, at about fifteen minutes before midnight, while those actuative strokes of the rock arm which merely move the calendar wiper 4 out of contacting positions occur at about fifteen minutes before noon. It is, therefore, apparent that at twelve o'clock midnight the calendar wiper 4 will always be in contacting position with one of the contact screws of the calendar mechanism, while at twelve o'clock noon the calendar wiper will always be in one of its intermediate or non-contacting positions, and, since the calendar contact screws are seven in number and are arranged in successive order corresponding to the successive days of the week, it is apparent that successive midnights will find the calendar wiper in contact with its successive contact screws corresponding to the successive days of the week. The week day corresponding to any given contact screw is the day following the midnight which introduces the calendar contact wiper into contact with such given contact screw, in order that the calendar mechanism may, at each midnight, as will be further pointed out hereinafter, selectively adjust the calendar-controlled day levers to locate the record-receiving card or time card in position to receive its record in a certain segment corresponding to such day of the week.

The circular rotating calendar dial 147 is disposed in parallelism with the clock dial 149 of the sub-movement or electrically controlled clock movement, and a small portion of the face of the calendar dial at the upper side thereof is exposed to view through a small window 148 in the clock dial 149.

The areas of the calendar dial which are successively exposed to view through the window 148, are marked with characters which, in a given position of the calendar wiper 4, indicate the twelve hour period to which such position of the calendar wiper corresponds, for instance, the letters F and A exposed to view through the window 148, in Fig. 1, indicate that the calendar wiper 4 of the mechanism is in the position which it should occupy during Friday A. M. The next indication exposed in successive order through the calendar window 148 will be the letters F and P, showing that the calendar wiper 4 has moved to the position which it should occupy during Friday P. M.

The calendar setting lever 68 is pivotally mounted upon a stud 164 screwed into the front face of the calendar frame plate 60. The pawl-retaining finger 68$^b$ of the setting lever extends above its pivotal center 164 and curves to the leftward over the rightwardly extending end of the ratchet-actuating pawl 57, so as to normally engage such pawl for the purpose already pointed out. The manually actuated arm of the calendar setting lever depends from its pivotal stud 164 and carries a calendar setting pawl 67, which engages the teeth on the under side of the calendar ratchet 65. A flat spring is at one end secured in the edge of the setting pawl 67 and at its other end bears upon a stop pawl or ratchet-retaining pawl 66, the purpose of which is to prevent backward rotative movement of the calendar ratchet, and the calendar parts impelled thereby. This flat spring maintains both the setting pawl 67 and the retaining pawl 66 in engagement with the toothed periphery of the calendar ratchet 65. A horizontal guide-yoke 72 is screwed at either end to the front face of the sub-frame plate 60 and spans the calendar-actuating rock arm 56 and the manually operated setting lever 68 in order to hold such members firmly in their proper planes of movement. A retraction spring 70, at one end inserted in the edge of the setting lever 68 and at its other end bearing against a stop pin 71, tends always to swing the setting lever into its normal position in which its pawl retaining finger 68$^b$ operates to prevent over-stepping of the calendar ratchet in the manner which has already been described. When it is desired to set the calendar mechanism, the calendar setting lever is grasped at its lower end, upon which is formed a handle 68$^a$, and is forced leftward so as to swing about its pivotal stud 164 and carry its setting pawl 67 leftward, thereby impelling the calendar ratchet 65 one step, while meantime the pawl-retaining finger 68$^b$ of the setting lever is swung about the pivotal axis thereof away from its position of engagement with the actuating pawl 57 so as to permit of raising the actuating pawl 57 and thus permit the step or movement of the calendar ratchet 65 as effected by the pawl 67 of the setting lever. As the handle of the lever 68 reaches the leftward limit of its movement, a contact spring 59 fixed upon the setting lever is brought into contact with a contact pin 162 mounted in, but insulated from, the front face of the calendar frame plate 60 and near the lower edge thereof. A connecting wire 3 leads to the contact pin 162 and as the contact spring 59 makes contact with the pin, such pin and its connecting wire 3 are brought into conductive connection with the calendar setting lever 68 and with the calendar frame plate 60 and the frame work of the sub-movement generally. The object of this contact will be explained hereinafter.

In order to set the parts of the calendar mechanism in the positions which they should occupy at any given day of the week and during the forenoon or the afternoon thereof, it is only necessary to manually actuate the calendar setting lever 68 so as to move the calendar dial through one or more strokes until it displays through the calendar window of the clock dial an indication corresponding to such day of the week and to the forenoon or afternoon thereof according to the time of day.

In order to set the dial hands and the hour hand and minute hand contact wipers of the sub-movement, the hinged door 156 thereof is thrown open to give access to the thumb nut or gripping nut 151, which is then forced longitudinally inward or rearward so as to rearwardly thrust the minute hand spindle 42 and all the parts carried thereby, excepting the main pinion 33, the gear 32 and the clutch collar 39 fixedly connected with such main pinion, these parts being restrained by engagement of the gear 32 with the gear 30. The other gears which move with the longitudinal movement of the main spindle or minute hand spindle 42, slide in meshing engagement with their respective coöperating gears, which are longitudinally fixed and hence do not partake of the longitudinal movement of the main spindle. As the minute hand spindle 42 is thrust rearward, its clutch collar 40 is disengaged from the coöperating clutch collar 39 fixed to the main pinion 33, so that while the minute hand spindle and its clutch collar are held in such longitudinal positions, they may be freely rotated by means of the gripping nut 151 so as to set the dial hands and the contact wiper hands in any desired position corresponding to the time of day.

That embodiment of my invention which is illustrated in Fig. 2 comprises a master chronometer or clock movement 160 which is diagrammatically indicated and which includes a contact-making ratchet 109 mounted upon the minute hand spindle of the movement or otherwise connected with the clock movement so as to rotate in fixed relation to the minute hand thereof. The contact-making mechanism which coöperates with this contact-making ratchet 109 comprises a suitable bracket 108, upon which is mounted one end of a flat spring 107, the other end of which carries a rigid ratchet-engaging plate 106 and a comparatively light flat contact spring 105 and an insulating block 103 and a contact plate 104, such parts being preferably secured to one another and to the free or swinging end of the flat spring 107 by means of rivets or screws suitably insulated from the contact plate 104, which contact plate is otherwise insulated from the other metallic members by means of the insulating block 103 interposed between such contact plate and such other members. The ratchet-engaging plate extends forward toward the contact-making ratchet 109 and has its free or swinging end held in substantial tangential engagement with the toothed periphery of the contact-making ratchet, so that such free or ratchet-engaging end of the ratchet-engaging plate 106 rises upon the high points of the ratchet teeth as the same pass underneath such end of the ratchet-engaging plate and falls into the openings between the teeth as the high points of the teeth pass out of engaging position therewith. The comparatively light contact-making spring 105 extends forward in parallelism with the ratchet-engaging plate 106, but projects a slight distance beyond the ratchet-engaging end of such plate so that, when the ratchet-engaging plate drops into the spaces between the ratchet teeth, as illustrated in Fig. 3, the free or ratchet-engaging end of the contact spring 105 will be carried by such drop of the ratchet-engaging plate into contact with the high point of the ratchet tooth which has just passed beyond position of engagement with the plate, thus preventing the contact spring 105 from further following the drop movement of the plate 106 into the hollow of the ratchet tooth and causing such contact spring 105 to be retained momentarily on the high point of the tooth. The contact-making end of the contact plate 104 adjacent to the free or contact-making end of the contact spring 105 is bent toward such contact spring, so that the clearance between the contact ends of the plate and spring is somewhat less than the depth of the spaces between the teeth of the contact-making ratchet 109, and as the front end of the ratchet-engaging plate 106 slips off from the high point of a given tooth of the ratchet and falls into the space between the teeth, the movement of the spring 107, which is permitted by such release of the contact plate from the high point of the ratchet tooth, carries the contact-making plate 104 into contact with the contact-making end of the contact spring 105, which is momentarily held upon the high point of the ratchet tooth. This contact-making position of the parts is illustrated in Fig. 3. The distance by which the contact spring 105 overlaps the ratchet-engaging plate 106 is so slight that the engaging tooth of the ratchet in its rotation soon passes from under the contact-making spring and permits the same to spring back into its normal position of parallelism with the ratchet-engaging plate 106 and out of contact with the contact-making plate 104. As the contact-making ratchet 109 continues to rotate, its next successive tooth raises the ratchet-engaging plate 106 and the contact-making operation is repeated, each contact having a duration equal to the time required for the engaging ratchet tooth to pass from under the contact-making spring after such spring has been brought into contact with the tooth by the action of the spring 107, which forces the ratchet-engaging plate 106 into the hollow space between the ratchet teeth. The ratchet teeth are twelve in number, thus periodically effecting contact between the contact-making plate 104 and its coöperating contact spring 105 twelve times in each hour, or at five-minute intervals. The angular position of the contact-making ratchet is so adjusted that it effects such contact a few seconds before the end of each five-minute interval of the hour and breaks such contact exactly at the end of such five-minute interval and at the beginning of the next five-minute interval, for instance contact will be made a few seconds before 12.05, 12.10, 12.15, etc., and will be broken at exactly 12.05, 12.10, 12.15, etc.

The master chronometer controls the sub-movement or electrically controlled clock movement of the recording apparatus through a circuit shown in the diagram of Fig. 2 and including the battery 161, wires 5 and 7, contact-making plate 104, its coöperating contact spring 105, non-insulated metallic portions of the master chronometer mechanism, wire 8, escapement magnet 28 and wire 6 back to the opposite pole of the battery. Each time that the master chronometer makes contact between its contact-making plate 104 and contact-making spring 105, the foregoing controlling circuit is closed and the escapement magnet 28 is energized so as to draw downward its escapement lever 21 and permit the escapement disk 17 to advance the short angular distance between its two escapement pins. This slight preliminary movement of the escapement disk 17 results only in negligible movement of the hour and minute dial hands of the sub-movement and the hour hand and minute hand contact wipers thereof, but, a few seconds later, when at the exact ending of the five-minute interval the master chronometer breaks at its controlling contacts the foregoing circuit of the escapement magnet 28, the magnet is deënergized, its escapement lever is retracted and the escapement disk 17 passes through the entire remaining portion of its revolution, which remaining portion is almost a complete revolution. Thereupon the minute and hour hands of the sub-movement as well as the contact wipers thereof move through angular spaces corresponding to five-minute intervals, since the train of gears leading from the minute-hand spindle 42 to the escapement disk is such that a single revolution of the escapement disk effects an angular movement of the hands and contact wipers corresponding to a five-minute interval of time. Each of these five-minute movements of the dial hands and contact wipers of the electrically controlled clock movement carries the minute hand of the dial from one of the index characters thereon to the next index character and carries the hour hand of the dial through one-twelfth of the angular distance between the index characters, while the minute hand contact wiper $m$ of the time-controlled selective commutator of the sub-movement is carried through a five-minute angular interval and from one of its coöperating contact segments to the next neighboring contact segment in their successive circumferential order, the hour hand wiper being moved through a five-minute angular interval with each five-minute movement of the minute hand wiper so that the hour hand wiper passes from one of its coöperating contact segments to the next coöperating contact segment during each twelfth movement or step of the minute hand wiper, such twelfth movement of the minute hand wiper being its movement in which it passes onto its contact segment $oob$ representing the completion of the last or the twelfth five-minute interval of the hour. Normally, that is to say, when there is no current passing through the controlling electric circuit and when the parts of the sub-movement are stationary, the minute hand of the dial points directly to one of the index characters thereon, while the minute hand wiper $m$ of the selective commutator occupies a corresponding angular position and is in contact with one of its contact segments and at the contact breaking end of such segment or end at which the contact wiper leaves the segment, this being the condition of the apparatus illustrated in Fig. 2, which shows a rear view of the selective commutator with its minute hand and hour hand contact wipers, while the minute and hour hands of the dial, although not shown in the diagram, occupy corresponding positions. The contact wipers, being on the rear end of the minute-hand spindle, of course run in left hand direction.

The diagram, Fig. 2, shows the minute hand wiper $m$ in contact with the contact-breaking end of its coöperating contact segment $55^b$ corresponding to the fifty-fifth minute of the hour or the eleventh five-minute interval thereof, showing that such eleventh five-minute interval has been completed by the master chronometer and that the hands of the master chronometer are continuing through the twelfth five-minute interval of the hour, which twelfth five-minute interval, in the illustrated instance, is the twelfth interval of the twelfth hour, so that the hour hand wiper of the sub-clock is in contact with the contact-breaking end of its coöperating contact segment $11^a$ corresponding to the preceding or eleventh hour. In this condition of the sub-movement the minute hand of its dial points directly to the index character XI, while the hour hand thereof has almost reached the XII mark. Now, just before the minute hand of the master chronometer attains the XII mark, the master chronometer will complete the controlling circuit of the escapement magnet 28 and the hands and wipers of the sub-clock will pass through a slight preliminary movement, which, however, will not result in changing the contacts of either the minute hand or the hour hand wiper. But just when the master chronometer indicates twelve o'clock exactly, its controlling contacts will be broken, the escapement magnet 28 will become deënergized, its escapement disk will move through substantially a complete revolution, the minute hand and minute hand wiper of the sub-clock will move through a five-minute interval carrying the minute hand wiper to the contact-breaking end of its coöperating contact segment $oob$, and carrying the hour hand wiper onto the contact-making end of its coöperating segment $12^a$, while at the same time causing such hour hand wiper to make momentary contact with the additional contact-making spring 2 mounted upon the face of the insulating commutator dial 49. At the expiration of every other hour the hour hand wiper similarly passes from one of its contact segments to the next contact segment, although it is only at the expiration of the twelfth hour that the additional contact is made between the hour hand contact wiper and its coöperating contact spring 2. It must be remembered that just a few minutes, preferably about fifteen minutes, before the expiration of each twelfth hour, the calendar wiper 4 of the sub-movement is actuated so as to pass through one step of its revolution, each night step bringing the calendar wiper into contact with one of its coöperating contact screws, while each day step brings the calendar wiper into one of its intermediate non-contacting positions. The diagram shows the calendar wiper in such a non-contacting position intermediate between its coöperating contact screws $Su'$ and $M'$, this being the position into which the calendar wiper was moved at about fifteen minutes before twelve, that is to say, about fifteen minutes prior to the condition illustrated in the diagram, this condition being the condition of the apparatus at two and one-half minutes before twelve M. Monday. Now, as exact noon Monday is reached and as the hour hand wiper $h$ passes under and makes momentary contact with its contact spring 2, no circuit is completed by such contact between the wiper and spring, but at about a quarter of twelve Monday night the calendar wiper 4 will be brought into contact with its coöperating contact screw $M'$ and then, when the hour hand wiper again makes contact with its contact spring 2 at exact midnight Monday, or, in other words, at the beginning of Tuesday morning, such contact will complete the following circuit: from one pole of the battery 161, through wire 6, frame work and metallic portions of the electrically controlled clock movement or sub-movement, hour hand wiper $h$ thereof, contact spring 2, wire 3, brush 73, and contact nut 74 (Figs. 7 and 8), main spindle 75 of the calendar mechanism, contact wiper 4 thereof, its contact screw $M,'$ connecting strip or ribbon $M^2$, terminal screw $M^3$, connecting wire $M^4$, day magnet M, and conductor 5 back to the opposite pole of the battery 161. Closure of the foregoing circuit energizes the day magnet M and causes it to attract the armature $M^9$ of the day lever $M^6$ so as to swing the card-engaging tongue $M^{10}$ of the day lever, together with the card-engaging tongue $M^8$ of its switch-actuating spring $M^7$, rearward out of card-engaging positions, so that the next time a card is inserted into the card hopper to receive a record it will pass freely downward in front of such card-engaging tongues of the day lever $M^6$ and its day spring and will engage the card-engaging tongue $Tu^8$ of the switch-actuating spring of the next day lever $Tu^6$. This retraction of the day lever $M^6$ and its switch-actuating spring does not occur, however, until midnight Monday, so that such lever and spring have been in their card-engaging positions all day Monday so as to arrest any card placed in the card hopper during Monday in its proper position to receive a record in its first horizontal column or Monday column marked M, as illustrated in Fig. 11, such horizontal Monday column being arranged to receive in horizontal order and in successive vertical columns recording marks indicating the time of commencement and termination of the periods of occupation of the workman or employee to whom the card belongs. But after midnight Monday the Monday calendar lever or day lever $M^6$ is withdrawn from card-engaging or card-positioning position, and from then on until midnight Tuesday the Tuesday card-positioning lever $Tu^6$ is in card-positioning or card-engaging position so as to locate or position the time cards placed into the card hopper in positions to receive their records in their Tuesday column, which is the horizontal column second from the bottom and marked $Tu$, as illustrated in Fig. 11.

At Tuesday midnight the Tuesday day lever or card-positioning lever and its card-engaging switch-actuating spring are retracted by energization of the Tuesday day magnet, in the same manner that the Monday day lever and its spring were retracted by the Monday day magnet, the circuit of the Tuesday day magnet $Tu$ being momentarily closed at the contact spring 2 on the commutator dial and being traceable as follows: from one pole of the battery 161 through the conductor 6, frame work and metallic portions of the sub-movement, the hour hand wiper $h$ thereof, the contact spring 2, conductor 3, the brush 73 and the contact nut 74 (Fig. 8), the main spindle 75 of the calendar mechanism, the calendar wiper 4 thereof, the calendar contact screw $Tu'$ with which the calendar wiper 4 is brought into contact at about fifteen minutes before twelve Tuesday night, and from the calendar contact screw $Tu'$ through the connecting strip $Tu^2$, terminal screw $Tu^3$, conductor $Tu^4$, Tuesday day magnet $Tu$ and conductor 5 back to the opposite pole of the battery. The withdrawal of the Tuesday day lever or card-positioning lever and its switch-actuating spring at midnight Tuesday permits the cards inserted into the hopper, after Tuesday midnight and during Wednesday and Wednesday night, to pass freely downward in front of both the Monday and Tuesday card-positioning levers and their springs until the time-card engages the card-engaging tongue of the switch-actuating spring $W^7$ mounted on the Wednesday day lever $W^6$. The engagement of the card with the switch-actuating spring $W^7$ of the Wednesday day lever arrests the card in its Wednesday printing or record-receiving position in which it will receive its record or records upon its Wednesday column, which is the third horizontal column from the bottom and which is marked W as illustrated in Fig. 11. Thus at each midnight the card-positioning day lever and its switch-actuating spring, which have been operative during the preceding twenty-four hours, are withdrawn and leave in operative position the day lever and switch-actuating spring which must operate to determine the record-receiving position of the time card during the twenty-four hours following such midnight. This successive withdrawal of the respective day levers and their attached switch-actuating springs continues up to and including Saturday night, when the Saturday day lever $Sa^6$ and its switch-actuating spring or day spring $Sa^7$ are withdrawn so as to leave the Sunday switch-actuating spring or day spring $Su^7$ in card-positioning control of the recording apparatus during the next twenty-four hours following Saturday midnight. About fifteen minutes before the expiration of such twenty-four hours following Saturday midnight, or, in other words, about fifteen minutes before Sunday midnight, the calendar contact wiper 4 is brought into contact with the calendar contact screw $Su'$, and at exactly midnight Sunday the hour hand wiper $h$ of the selective commutator of the sub-movement makes momentary contact with the contact spring 2 and closes the circuit of the day-lever replacing magnet $Su$, which circuit leads from one pole of the battery 161, through the conductor 6 and the further path already traced up to the calendar contact wiper 4, and thence through the calendar contact screw $Su'$, connecting strip $Su^2$, terminal screw $Su^3$, conductor $Su^4$, day-lever replacing magnet $Su$ and conductor 5 back to the opposite pole of the battery 161. Such closure of the foregoing circuit of the day-lever replacing magnet $Su$, at midnight Sunday, energizes such magnet, which thereupon actuates its replacing lever 289 to swing the day-lever replacing bridge 288 against the overlapping ends of the day levers and restore all such day levers to their card-engaging or card-positioning positions so that when the time-card is inserted into the card hopper after Sunday midnight and during the next twenty-four hours following, such card will be located by the Monday day lever $M^6$ and its day spring $M^7$.

The time-card is inserted into the hopper in the inverted position illustrated in Fig. 11, with its record-receiving face exposed toward the front of the machine or toward the record-marking ribbon. The card is then pressed downward until it comes in contact with the card-engaging tongue of the first day spring which is in operative or card-engaging position. The lower edge of the card then presses down on the card-engaging tongue of the day spring until such spring has closed the contacts $80^a$, 84, of the card-actuated switch which controls the actuative electric circuits of the recording mechanism. Thereupon electric current is transmitted through one type-actuator magnet of the hour set and through one type-actuator magnet of the minute set, the hour and minute type-actuator magnets thus energized being selected by the selective commutator of the electrically controlled clock movement and corresponding respectively to the last expired hour and to the last expired five-minute interval of the succeeding hour during which the card is inserted into the hopper to receive its record. For instance, assuming that the time is about two and one-half minutes before midday Monday, as indicated in the diagram of Fig. 2, the card will be pressed downward until it engages the card-engaging switch-actuating spring $M^7$ of the Monday day lever and will then press downward upon such spring and slide the controlling switch 80 downward until its contact blade $80^a$ makes conductive contact with its coöperating contact spring 84, whereupon current will be transmitted through the following circuit and branches thereof: from one pole of the battery 161, through conductor 6 and through the frame work and metallic portions of the sub-clock movement to the minute hand wiper $m$ and the hour hand wiper $h$ thereof, and from such contact wipers by way of two parallel branches to the conductor marked $196^\times$ in the diagram and corresponding to the common bus bar 196 of Figs. 12, 9 and 13, one of such parallel branches leading from the minute hand wiper $m$ through its coöperating contact segment $55^b$ corresponding to the last expired five-minute interval of the hour and thence through conductor $55^c$ and the type-actuator magnet $55^d$ of the minute set of actuator magnets and likewise corresponding to such last expired five-minute interval, and from such type actuator magnet to the conductor $196^\times$, while the other parallel branch leads from the hour hand wiper $h$ through its coöperating contact segment $11^a$ corresponding to the last expired or eleventh hour, and from such contact segment through conductor $11^e$, and thence through the type-actuator magnet $11^f$ of the hour set of actuator magnets and corresponding to such last expired eleventh hour and thence to the conductor $196^\times$, where the two foregoing parallel branches reunite, and from the conductor $196^\times$ the circuit continues through one of the ribbon-feed magnets, in the instance illustrated in the diagram through the right-hand ribbon-feed magnet 207, and thence through the conductor 112, the lower pair of contact springs 244, the lower contact arm 233 of the T-shaped switch lever proper, the conductor 114 of the diagram corresponding to the main frame plate 115 of the recording mechanism, the vertical sliding main bar 80 of the card-actuated controlling switch, its contact blade 80ª and coöperating contact spring 84, and thence through the conductor 5 back to the opposite pole of the battery 161. Upon closure of the foregoing circuit and its branches through the type-actuator magnets 11ᶠ and 55ᵈ, such magnets are energized and immediately attract their respective armatures thereby operating their respective type-bar actuators so as to impel their respective type bars and types proper through their striking or record-marking movements. The type bars thus actuated by the respective type-actuator magnets carry inverted types which mark upon the time cards the inverted characters 11 and 55 respectively, the character 11 being struck just to the right of the character 55 as such characters are viewed in the inverted position of the card illustrated in Fig. 11, so that the character 11 will appear just to the left of the character 55 when the card is turned over and held upright in the position in which it is to be read. Since the card, in the present instance, is positioned or located by the Monday day lever and its card-engaging spring, these recording marks will, of course, appear in the Monday column, and the lateral location of such recording marks will be determined by the lateral position of the card hopper as governed by the position of the hand crank. For instance, assuming that the card is inserted into the recording mechanism by an employee who has just arrived at the factory or place of employment for the first time on the Monday morning which we are considering, he will then place the hand crank 134 in its extreme right-hand position indicated by the escutcheon marked IN A. M., thus causing his time-card to be located in position to receive its record in the first of the record-receiving vertical columns marked A. M. IN at the head of the time-card, or at its foot as held in inverted position. The hand crank 134 similarly locates the time-card to receive its recording marks in its other vertical columns according to whether or not the employee is leaving in the morning, returning in the afternoon, leaving in the afternoon, returning for an extra session at night, or leaving after such extra session.

It has already been noted that the circuit through the type-actuator magnets includes also one of the ribbon-feeding magnets, so that each time the recording mechanism is actuated to print a record, the ribbon-feeding magnet which is in circuit, for instance the right-hand ribbon feeding magnet 207 as in the instance illustrated in the diagram, Fig. 2, attracts its armature or horizontal magnetic rock arm such as 120 and thus actuates the bell-tappet to strike the bell and give indication that the record has been printed on the time-card. The same movement of the magnetic rock arm 120 also swings the vertical rock shaft 118 so as to carry its ratchet-driving or ribbon-feeding rock arm 119 to extreme rightward position, and after the type-actuating circuit is opened by withdrawal of the time-card, not only do the actuated type-bars resume their normal positions, but such breaking of the circuit results in deënergizing the ribbon-feed magnet which has been energized so that its magnetic rock arm is retracted by its retraction spring such as 269 and its vertical rock shaft such as 118 and ribbon-feeding rock arm such as 119 are impelled in ratchet-driving or ribbon-feeding direction so as to feed the record-marking ribbon one step. After the ribbon has thus been fed by a given amount in one direction, in this instance the rightward direction, the opposite ribbon-feeding magnet, such as the left-hand ribbon-feeding magnet 207ª, will be thrown into circuit by reversal of the T-shaped switch lever 232 which, when reversed, will break contact with its lower contact springs 244, thus breaking the circuit of the right-hand ribbon-feeding magnet while making contact with its upper contact springs 244ª so as to complete the circuit of the left-hand ribbon-feeding magnet through a circuit branch traceable from the conductor 196ˣ through the wire 371ª, left-hand ribbon-feeding magnet 207ª, conductor 111, contact springs 244ª and upper arm 232 of the switch lever.

We may now note the function of the contact between the contact pin 162 and the contact spring 59 mounted upon the calendar setting lever 68. Each time that the calendar setting lever 68 is moved leftward about its pivotal axis so as to impel the calendar ratchet and the calendar contact wiper 4 one step, conductive contact is made between the contact pin 162 and the contact spring 59. As has already been noted, each alternate step of the contact wiper 4 brings such contact wiper into contact with one of the calendar contact screws, while the intermediate alternate steps bring such contact wiper into its non-contacting intermediate positions. Those strokes of the calendar setting lever which bring the contact wiper into its intermediate non-contacting positions produce no effect by contact of the spring 59 with the contact pin 162, since such strokes of the calendar setting lever do not complete any circuit at such contacts 59, 162, but each stroke of the setting lever which brings the calendar wiper into contact with one of the calendar contact screws and which at the end of such stroke makes conductive contact between the contact spring and coöperating contact pin, closes at such contacts a circuit traceable through such contacts and through the contact wiper 4 and that given calendar contact screw with which the wiper is in contact at the moment, and hence closes a circuit traceable through the day magnet corresponding to and connected with such given contact screw. For instance, let us assume that the calendar setting lever 68 is manually moved to its leftward position when the calendar wiper is in its position indicated in the diagram, Fig. 2. The calendar wiper 4 is then impelled from its intermediate non-contacting position, between the calendar contact screws $Su'$ and $M'$, into position of contact with the contact screw $M'$, while at the same time contact is made between the contact spring 59 and its contact pin 162, thus completing the following circuit through the Monday day magnet M: from one pole of the battery 161 through the wire 6 to the frame work and metallic parts of the electrically controlled sub-clock movement and thence to the calendar setting lever 68, and thence through the contact spring 59, its coöperating contact pin 162, the wire 3, brush 73 and contact nut 74 (Fig. 8), calendar spindle 75, calendar wiper 4, calendar contact screw $M'$, connecting strip $M^2$, terminal screw $M^3$, connecting wire $M^4$, day magnet M, and wire 5 back to the opposite pole of the battery. Upon closure of the foregoing circuit through the Monday day magnet M, such magnet is energized and effects withdrawal of the card-engaging parts of the Monday day lever and its card-engaging spring. Thus each stroke of the calendar setting lever 68 which moves the calendar wiper 4 into position of contact with one of the calendar contact screws, effects withdrawal of the card-engaging day lever and card-engaging day spring corresponding to such contact screw, so that when the calendar wiper 4 is rotated from its present position, or from any position, so as to bring it successively into contact with its successive calendar contact screws, the successive day magnets will be energized successively and will successively retract their respective day levers and day springs until the calendar wiper contacts with the contact screw $Su'$, whereupon the day-lever replacing magnet $Su$ will be energized and all the day levers will be replaced. Thus, while setting the calendar wiper in any given position corresponding to any given day of the week and time of day on which the calendar is set, the day magnets are correspondingly adjusted to locate the time-card in position to receive its record in the horizontal day column corresponding to such day of the week.

The system diagrammed in Fig. 23 is similar to that of Fig. 2, excepting that the system of Fig. 23 comprises a plurality of recording apparatuses similar to the apparatus comprised in the system of Fig. 2 and shown in front view in Fig. 1. These recorders of Fig. 23 are marked A, B and C. Like the recorder of Figs. 1 and 2, they comprise sub-movements controlled by escapement magnets 28, in this instance all connected in series with one another and with the battery 161 and with the controlling contacts of the master chronometer 160. The internal actuative circuits of the recorders are the same as the circuits of the recorder of Figs. 1 and 2, and in the present instance such circuits are fed by feed wires 6 communicating with one pole of the battery 161 and leading to the frame work and metallic portions of the various sub-movements, and by feed wires 5 connected with the contact springs 84 of the various recorders and communicating with the opposite pole of the battery 161. The operation is obvious.

I will now describe that modification of the recording mechanism of my invention, which is illustrated in Figs. 17 and 18. In this modification, the type bars are pivotally mounted upon pivot pins disposed in the order of the arcs of circles, the hour set and minute set of type bars having, as in the case already described, common striking centers side by side, but in the present instance the type-bar actuators are parallel with one another and are bent at their upper ends into the planes of the type bars with which they respectively coöperate. At their lower or pivotal ends the hour and minute sets of type-bar actuators may be mounted upon respective common pivot rods such as 321 passing through the slotted brackets such as 322 in which the actuators are pivotally mounted. A series of actuative tumblers such as 311, one for each type-bar actuator, are pivotally mounted just in front of their respective type-bar actuators and in respective slots such as 336 in a common carrier bar 325, which is integrally formed upon, and as a yoke unites, the two magnetically-actuated rock arms 324 pivotally mounted at their lower ends in suitable pivot brackets such as 327. The tumblers may be mounted upon a common pivot rod such as 312 sunk in a central slot running along the upper edge of the carrier bar. The magnetically actuated rock arms 324 may be mounted in their pivotal brackets 327 upon a common pivot rod 318 which passes through and is supported in such pivotal brackets and which acts also as a common pivot rod for the series of electrically controlled selective levers such as 314 suitably located by bushings such as 319 interposed between adjacent selective levers and between the outer selective levers and the pivot brackets 327. Magnetic armatures such as 320 and $320^a$ are mounted upon the inner edges of the selective lever below their common pivotal axis and are actuated or held by respective electro-magnets such as 329 and $329^a$ of the form shown in longitudinal section in Fig. 17 and shown in Fig. 18 on a plane of section which is the plane of the rear face of the main frame plate 115. The depending arms of the selective levers 314, that is to say, their arms depending from their common pivot rod 318, are of alternate short and long lengths, so that their armatures such as 320 and $320^a$ mounted upon the inner edges of such depending arms of the selective levers and at the lower ends of such arms, are arranged in upper and lower staggered sets 320 and $320^a$ respectively, their respective selective electro-magnets being similarly arranged in upper and lower sets staggered relatively to each other and comprising respectively the upper magnets 329 and the lower magnets $329^a$. The upper or tumbler-engaging arms of the selective levers 314 are all of one length and project upwardly in respective parallel planes which are common to their respective actuative tumblers 311 and type-bar actuators. The actuative tumblers are approximately right angled or L-shaped and pivotally mounted at the corner of the angle or L and have their longer arms projecting horizontally rearward towards their respective type-bar actuators while their shorter arms depend from their common pivot rod 312 in the slots in which the tumblers are mounted. The rearwardly projecting or actuative horizontal arms of the tumblers, are provided with actuator-engaging notches 310 which receive, or engage, the tumbler-engaging projections 309 extending forward from the front edges of the type-bar actuators. Such engagement between the horizontal arms of a given tumbler and its coöperating tumbler-engaging projection on its respective actuator, only occurs, however, when the carrier bar 325 is swung forward about its pivotal axis 318 and only when the horizontal or actuative arm of such given tumbler shall be dropped into engaging position in a manner which will soon be described, the normal position of the actuator engaging arm of the tumbler being such that it passes freely over its respective tumbler-engaging projection 309 and hence does not move its respective type-bar actuator when the carrier bar 325 is swung forward with its tumblers. The upper end 313 of each tumbler-engaging arm of the selective levers engages the front side of the depending arm of its respective tumbler and is normally held in continuous engagement therewith by a spring such as 315 secured to the under side of the tumbler carrier bar and bearing upon the front edge of such tumbler-engaging arm. Normally each selective lever follows the carrier bar and its tumblers as the carrier bar is swung rearward about its pivotal axis 318, such axis being also the axis of the selective levers so that when the carrier bar is thus swung forward, the selective levers are held by their springs 315 in their normal tumbler-engaging position and do not change their positions in relation to the tumblers or the tumbler bar. The forward swinging movement of the carrier bar is effected by the magnetic attraction of two printing electro-magnets 328 which are mounted upon the rear face of the main frame plate 115 with their polar ends projecting forwardly through such frame plate and towards respective printing armatures 323 secured upon the rear edges of the two magnetically actuated rock arms 324 which bear the carrier bar 325.

The armatures 320 and 320$^a$ of the selective levers normally lie in contact with the poles of their respective selective magnets and when the carrier bar 325 is swung forward by the magnetic attraction of the magnets 328 upon the printing armatures 323, all of the selective levers whose selective magnets are not energized by the electric current swing freely forward with the carrier bar so as to continuously press upon the depending arms of their respective tumblers and hold such tumblers out of their actuator engaging positions or out of their positions for engaging the tumbler-engaging projections 309 upon their respective type-bar actuators. But those selective magnets which are energized by electric current retain their respective armatures such as 320 or 320$^a$ in their initial positions, so that their selective levers are restrained from moving forward with the carrier bar when it is actuated by the printing magnets, and the respective tumblers of the selective levers thus restrained, move rearwardly away from the tumbler engaging ends 313 of their respective selective levers so that the pressure of such tumbler-engaging ends of the selective levers upon their respective tumblers is removed and the horizontal or actuator-engaging arms of the tumblers are dropped or swung down into operative or engaging positions in which they will engage the projections 309 on their respective type-bar actuators so as to force such type-bar actuators rearwardly and cause the same to actuate their respective type-bars to print a record. The horizontal or actuative arms of the tumblers may be caused to thus drop into operative positions either by gravity, or by small positioning springs such as 326 secured upon the rear face of the carrier bar 325 and pressing upon the rear edge of the depending arm of the tumbler. When the printing magnets are deënergized, the carrier bar and its tumblers and all of the selective levers are restored to normal positions by suitable retractive springs such as 317 which may be mounted upon the front face of the main frame plate 115 so as to press forward upon the rear edges of the magnetically operated rock arms 324.
When the printing mechanism illustrated in Figs. 17 and 18 is employed, the card-actuated controlling switch and system of circuits such as diagrammed in Fig. 22 may be used in connection therewith. The time card when inserted into the hopper will, through the agency of one of the switch actuative pins 80$^M$, 80$^{Tu}$, 80$^W$, etc., cause the card actuated controlling switch 365 to be pressed downward against the resistance of its retractive or replacing spring 388 so that its contact making finger 364 of insulating material will engage the contact spring 368 and force the same into contact with its coöperating spring 367 thereby closing a circuit through two of the selective electro-magnets shown in Fig. 22 and which may correspond to two of the selective electro-magnets of the mechanism shown in Figs. 17 and 18. Such circuit through the selective magnets is traceable in the diagram Fig. 22 as follows: From one pole of the battery 360 through the conductor 361, contact spring 368, its coöperating contact spring 367, and conductor 369 to the hour hand and minute hand contact wipers $h$ and $m$ respectively of the time controlled selective commutator, and thence by way of two parallel branches to the conductor 358. The branch from the hour hand wiper leading through its coöperating contact segment 1$^a$, conductor 1$^e$ and selective magnet 1$^f$ of the hour set and thence to conductor 358 and the branch from the minute hand wiper leading through its coöperating contact segment 45$^b$, conductor 45$^c$ and selective magnet 45$^d$ of the minute set and thence to the conductor 358 where the two branches reunite and through which the circuit continues back to the opposite pole of the battery 360. Thus one selective magnet of the hour set and one selective magnet of the minute set are energized by the movement of the card-actuated switch as the card is inserted into the card hopper, and the armatures of the selective levers controlled by such selective magnets are strongly held against such selective magnets so that the selective levers will be retained when the carrier bar 325 is swung forward by attraction of the printing magnets. The circuit of the selective magnets is closed prior to the closing of the circuit of the printing magnets so that such selective magnets have ample time to attain their full degree of magnetism and attraction before the carrier bar is actuated, this result being obtained by the design of the card actuated switch which requires that, in order to close the circuit of the printing magnets, such switch must be pushed by the time card a considerable distance beyond the position in which it closes the circuit of the selective magnets. The circuit of the printing magnets is closed by conductive engagement between the contact springs 362 and the contact blade 363 fixedly secured to the main bar 365 of the card actuated switch, such printing circuit being as follows: From one pole of the battery 360 through the conductor 361, contact springs 362, contact blade 363, main bar 365 of the switch, conductor 114, ribbon feed reversing switch 356, thence through one of the ribbon feeding magnets to conductor 373, for instance through the right hand ribbon feeding magnet 207 by way of the contact springs 244, conductor 112, and right hand ribbon feeding magnet 207 to the conductor 373, thence through one of the printing magnets 328, conductor 357, the other printing magnet 328 and conductor 358, back to the opposite pole of the battery. Upon closure of the foregoing printing circuit, or circuit of the printing magnets 328, such magnets attract their printing armatures 323 and swing the carrier bar 325 rearward. As the carrier bar is thus moved rearward its tumblers which are released by disengagement with the selective levers retained by those magnets which have been energized, drop into actuative positions and thrust rearwardly upon their respective type-bar actuators so as to effect actuation of their respective type-bars and thus print upon the time card the time recording characters selectively determined by the selective tumblers, selective levers, selective magnets, and ultimately by the time-controlled selective commutator.

The printing mechanism illustrated in Figs 19, 19ᵃ, and 20, is a modification of the mechanism shown in Figs. 17 and 18 and differs therefrom principally in that the printing or type-bar actuating movement of the carrier bar 325 and its tumblers 311 is manually effected in lieu of being effected electrically by the printing magnets. The construction and arrangement of the type-bars, type-bar actuators, tumblers, carrier bar, its rock arms, and selective levers and selective magnets, are the same as in the construction of Figs. 17 and 18, excepting minor differences among which may be noted: The mounting of the selective lever retaining springs 337 upon the front face of the carrier bar 325 in lieu of its underside, the absence of magnetic armatures upon the rock arms 324 of the carrier bar, and the normal position of the selective armatures 320 and 320ᵃ which, in the construction now under consideration, are normally r moved a slight distance from the polar extremities of their respective selective magnets, this being a feature which is equally applicable, as a modification, to the construction of Figs. 17 and 18. In the present construction an actuative printing arm 343 is mounted upon, and extends vertically upward from, the middle of the carrier bar 325. The upper end of this printing arm 343 terminates just underneath the hopper-shifting hand shaft 101ᵃ and is normally pressed forward, by effort of the retraction springs 317, against the rear face of the actuative collar 341ᵇ formed upon the inner or rear end of a longitudinally slidable thrust sleeve 341 concentrically surrounding the hand shaft 101ᵃ and sliding upon such hand shaft and also sliding within the journal 342 which serves as a bearing for the sleeve 341 and the hand shaft. A helical compression spring is coiled upon the hand shaft and interposed between the inner or rear end of the actuative collar 341ᵇ and a collar 101ᵇ formed upon the hand shaft and serving as a base for such spring and also as a thrust shoulder to engage the front face of the main frame plate 115. The actuative collar 341ᵇ upon the thrust sleeve 341 also acts as a stop to engage the rear end of the journal 342 to limit the forward movement of the sleeve 341. The outer or front end of the sleeve 341 terminates in a collar 341ᵃ, and just in front of this collar of the sleeve the hub 338 of the hand crank fulcrum is securely fixed upon the front end of the hand shaft 101ᵃ. A fulcrum arm 338ᵃ is integrally formed upon and depends from, the rear half or portion of the fulcrum hub, which portion is straddled by the forks 134ᶜ formed upon one end of the hand crank 134ᵃ opposite its handle 133ᵃ. The forks 134ᶜ straddle both the rear portion of the fulcrum hub and its depending fulcrum arm 338ᵃ, and at their lower extremities the forks are pivotally mounted upon the lower extremity of such fulcrum arm by means of a suitable pivot pin or fulcrum pin 339. On either side of the fulcrum hub the forks are provided with rounded enlargements 134ᵈ which are interposed between the front end collar 341ᵃ of the thrust sleeve 341 and the collar 338ᵇ formed upon the fulcrum hub just in front of that portion of the hub which is straddled by the forks of the hand crank. The hand crank is rotated about the axis of the hand shaft 101ᵃ in the usual manner so as to rotate the hopper shifting pinion 165 and determine the lateral position of the card hopper. When it is desired to print a time record upon a time card, the card is placed in the hopper and closes a card-actuated controlling switch which may be the same as the card-actuated controlling switch of the printing mechanism shown in Figs. 2, 9, 10, etc., or which may be the same as the card-actuated controlling switch of Fig. 22 omitting those contacts of the latter switch which control the circuit of the printing magnets. When the controlling switch is actuated by the time card it may close a selective circuit, or circuit through the selective magnets 334 and 334ᵃ, corresponding to the selective circuit of the diagram of Fig. 2 or the selective circuit of the diagram of Fig. 22, omitting in either case the printing magnets. Such closure of such selective circuit through the selective magnets 334 and 334ᵃ will cause them to attract their respective selective armatures such as 320 and 320ᵃ and will thereby swing their respective selective levers into non-retaining positions, or positions of disengagement with their respective selective tumblers 311, thus permitting such selective tumblers so disengaged to assume their actuative positions in which they may engage the tumbler engaging projections on their respective type-bar actuators. After thus inserting the time card and selectively setting the selective tumblers 311, the handle 133ᵃ of the hand crank will be pressed rearward, that is, toward the rear of the mechanism, so as to swing the hand crank about its pivotal or fulcrum pin 339 secured in the fulcrum arm 338ᵃ. The rounded portions 134ᵈ of the hand crank forks then swing rearward and push rearward upon the front collar 341ᵃ of the thrust sleeve 341 thereby thrusting such sleeve and its rear or print-actuating collar 341ᵇ rearwardly against the printing or actuative arm 343 mounted upon the carrier bar 325. Thus the carrier bar is caused to swing rearwardly, about its pivotal axis 318, and effect actuation of the type-bar actuators and their respective type-bars so as to print a record in a manner which has been described with respect to the operation of the mechanism of Figs. 17 and 18.

The card positioning means illustrated in Fig. 21 comprises a card-actuated slide 349 having a card engaging extension 350 projecting forward through a vertical guide slot 115ᵍ in the main frame plate 115ᶠ and in position to be engaged and actuated by the time card as it is inserted in the card hopper 77ᶠ. The engagement of the time card with this card-engaging extension 350 causes the card slide 349 to slide downward against the resistance of its retractive spring 351 coiled upon the guide stem 347 of the slide which is mounted in suitable upper and lower brackets 346 and 352 secured upon the rear face of the main frame plate. The spring is interposed between the bottom of the card-actuated slide and the upper surface of the lower bracket 352. The card-actuated slide carries on its rear side a contact making blade 348 which in sliding downward makes successive conductive engagements with contact springs $M^{17}$, $Tu^{17}$, $W^{17}$, etc., mounted upon the front face of an insulating plate 353 secured upon the rear ends of the upper and lower brackets 346 and 352. The calendar dial in the present instance is provided with contact segments $M^{15}$, $Tu^{15}$, $W^{15}$, etc., corresponding to the successive days of the week, and taking the place of the contact screws of the calendar commutator of the mechanism of Figs. 2, and 4 to 8 inclusive. These contact segments are connected by respective conductors $M^{16}$, $Tu^{16}$, $W^{16}$, etc., with the contact springs $M^{17}$, $Tu^{17}$, $W^{17}$, etc., corresponding to the respective days of the week. At the beginning of each day the calendar contact wiper 4 is moved into contact with the contact segment corresponding to that day, and at the end of such day the calendar contact wiper is moved out of contact with the contact segment corresponding thereto and into contact with the next contact segment corresponding to the next day of the week. After the card hopper $77^t$ is located in proper lateral position to record the beginning or ending of a given period of a day's occupation the card is placed into the hopper and is pressed downward until the contact making blade 348 of the card slide engages with a particular one of the contact springs, for instance, the contact spring $M^{17}$ as in the case illustrated by the diagram, which particular spring leads to that particular contact segment, in this instance the segment $M^{15}$, with which the calendar contact wiper 4 is at the moment in contact. Upon the instant of such contact between the contact making blade 348 and the particular contact spring which is in conductive communication with the calendar wiper 4, the printing circuit is closed and the time is instantly recorded while the time card is yet in that particular vertical position required for making initial contact with such particular contact spring. The printing circuit is as follows: From one pole of the battery 354 through the conductor 355, calendar contact wiper 4, one of its coöperating contact segments, in this instance the contact segment $M^{15}$, thence through one of the connecting wires to one of the contact springs, in this instance through the connecting wire $M^{16}$ and its contact spring $M^{17}$, thence through the contact blade 348 and metallic portions of the printing mechanism generally, thence through the ribbon feed reversing switch 356 conductively connected with the metallic portions of the printing mechanism and in the diagram shown as connected therewith by a conductor 114 and from the ribbon feed reversing switch 356 through one of the ribbon feeding magnets to the conductor $196^\times$ corresponding to the common bus bar 196 of the mechanism of Figs. 9, 12 and 13, in this instance from the switch lever 356 through the contact springs 244, conductor 112, right hand ribbon feeding magnet 207 and conductor 371 to the conductor $196^\times$, and thence in parallel through one selective or actuative magnet of the hour set and through one selective or actuative magnet of the minute set and by such parallel paths to the hour hand and minute hand contact wipers $h$ and $m$ of the time-controlled selective commutator, for instance, in the case illustrated by the diagram, from the conductor $196^\times$ through the selective or actuative magnet $2^t$ of the hour set, conductor $2^e$ and contact segment $2^a$ to its coöperating hour hand contact wiper $h$, and from the conductor $196^\times$ through the selective or actuative magnet $ood$ of the minute set, conductor $ooc$, contact segment $oob$ and its coöperating minute hand contact wiper $m$, and from the minute hand and hour hand contact wipers through the conductor 6 back to the opposite pole of the battery.

It will be apparent that my invention may be embodied in divers constructions and arrangements, and in various modifications of those particular embodiments which I have illustrated and particularly described, all coming, however, within the scope, spirit, principles and intent of my invention broadly.

Therefore, what I claim and desire to secure by Letters Patent, is:

1. Recording apparatus comprising recording mechanism normally *in statu quo* but operatable to make any one of a plurality of records substantially at a common point on a record-receiving medium, and time-controlled selective mechanism in selective control of the recording movements of the recording mechanism to selectively determine its record.

2. Time-controlled recording apparatus comprising recording mechanism normally *in statu quo* but operatable to make any one of a plurality of records substantially at a common point on a record-receiving medium, and selective means for determining the record-making movements of such recording mechanism.

3. Time-controlled recording apparatus comprising recording mechanism normally *in statu quo* but operatable to make any one of a plurality of records substantially at a common point on a record-receiving medium, and automatic selective means for automatically selectively determining the movements of such recording mechanism.

4. Recording apparatus comprising a plurality of separately movable recording devices normally *in statu quo* time-controlled selective means coöperative with the recording devices to selectively control their actuation, and a common actuative means arranged to actuate all the recording devices subject to selection of the time-controlled selective means.

5. Recording apparatus comprising a plurality of separately movable recording devices normally *in statu quo*, and arranged to mark their records substantially at a common record-receiving point and time-controlled selective means coöperative with the recording devices to selectively control their actuation.

6. Recording apparatus comprising recording devices normally *in statu quo*, time-controlled selective actuating means coöperative therewith, and common actuative means arranged to actuate all the recording devices subject to selection of the time-controlled selective means.

7. Time-controlled recording apparatus comprising recording devices normally *in statu quo*, automatic selective means coöperative therewith, and common actuative means arranged to actuate all the recording devices subject to selection by the automatic selective means.

8. Recording apparatus comprising electrically controllable recording mechanism normally *in statu quo* but operatable to make any one of a plurality of records, time-controlled electrical selective means in controlling selective coöperation with the recording mechanism to selectively determine its record, and one electric circuit controller arranged to actuate the recording mechanism to print all its records subject to selective control of the selective means.

9. Recording apparatus comprising electrically controllable separately movable recording devices, time-controlled electrical selective means selectively determining the actuation of the recording devices, and a common electric circuit controller arranged to actuate all the recording devices subject to selection by the selective means.

10. Recording apparatus comprising electrically controllable separately movable normally stationary recording devices, time-controlled electrical selective means selectively determining the actuation of the recording devices, and a common electric circuit controller arranged to actuate all the recording devices subject to selection by the selective means.

11. Recording apparatus comprising separately movable electrically controllable record-marking devices, record-controlling conductors in controlling relation to the record-marking devices, one or more sources of electric current in circuit with the controlling conductors, time-controlled selective circuit-controlling means in selective control of the record-controlling conductors, and a common actuative circuit controller in control of all the record-controlling conductors subject to selection by the selective circuit-controlling means.

12. Recording apparatus comprising separately movable electrically controllable record-marking devices, record-controlling conductors in controlling relation to the record-marking devices, one or more sources of electric current in normally open circuit with the controlling conductors, time-controlled selective circuit-controlling means in selective control of the record-controlling conductors, and a common circuit-closing device arranged to close the circuit of any one or more of the record-controlling conductors subject to selection by the selective circuit-controlling means.

13. Recording apparatus comprising separately movable electrically controllable record-marking devices and electrical conductors in control thereof and in circuit with one or more sources of electric current, time-controlled selective circuit-controlling means in selective control of the circuits of the said conductors, and auxiliary circuit controlling means located substantially at a common controlling point and also controlling such conductors but subject to selection by the time-controlled selective circuit-controlling means.

14. Recording apparatus comprising separately movable electrically controllable record-marking devices and electrical conductors in control thereof and in circuit with one or more sources of electric current, time-controlled selective circuit-controlling means in selective control of the circuits of the said conductors, and manually operable auxiliary circuit controlling means located substantially at a common controlling point and also controlling such conductors but subject to selection by the time-controlled selective circuit-controlling means.

15. Recording apparatus comprising separately movable recording devices arranged to mark their records substantially at a common point on a record-receiving medium, separate actuative electro-magnets for the recording devices, one or more sources of electricity in communication with the actuative magnets, and time-controlled circuit-selective means in selective control of the actuative magnets.

16. Recording apparatus comprising separately movable recording devices, separate actuative magnets coöperative therewith and communicating with one or more sources of electricity, time-controlled selective circuit-controlling means in selective control of the actuative magnets, and auxiliary circuit-controlling means located at a common controlling point and in control of the actuative magnets subject to selection of the time-controlled circuit-controlling means.

17. Recording apparatus comprising separately movable recording devices, separate actuative magnets coöperative therewith and communicating with one or more sources of electricity, time-controlled selective circuit-controlling means in selective control of the actuative magnets, and manually controllable auxiliary circuit-controlling means located at a common controlling point in control of the actuative magnets subject to selection of the time-controlled circuit-controlling means.

18. Time-controlled recording apparatus comprising separately movable recording devices pivotally mounted to strike substantially at one common striking or record-marking location, and time-controlled positioning means for holding a record receiving medium at such common record-marking location of the recording devices, and selective means in selective control of the recording devices.

19. Recording apparatus comprising means for holding a record receiving medium, recording devices pivotally mounted to move separately into striking or record-marking positions substantially co-incident, actuative means for the record-marking devices, and time-controlled selective means in selective control of the recording devices.

20. Recording apparatus comprising separately movable normally stationary recording devices movable into substantially co-incident striking or record-marking positions, and time-controlled selective actuative means coöperative therewith.

21. Recording apparatus comprising separately movable recording devices arranged to mark their records substantially at a common point on a record-receiving medium, and separate time-controlled actuative magnets for such recording devices.

22. Recording apparatus comprising recording devices separately movable to substantially co-incident striking or record-marking positions and separate time-controlled actuative magnets in actuative coöperation with the separately movable devices.

23. Recording apparatus comprising two sets of recording devices normally in *statu quo*, the devices of each set being movable to substantially co-incident striking or record-marking positions, means for actuating the recording devices, and time-controlled selective means in selective control of the actuation of the recording devices.

24. Recording apparatus comprising two sets of recording devices, each recording device of either set being separately movable from its normal position into a record-marking or striking position substantially co-incident with the record-marking or striking positions of the other recording devices of its own set, actuative means in actuative coöperation with the recording devices, and time-controlled selective means in selective control of the actuative means to selectively determine the actuation of one recording device of each set.

25. Recording apparatus comprising two sets of recording devices, each recording device of either set being separately movable from its normal position into a record-marking or striking position substantially co-incident with the record-marking or striking positions of the other recording devices of its own set and adjacent to the substantially co-incident or common striking positions or position of the recording devices of the other set, actuative means in actuative coöperation with the recording devices, and time-controlled selective means in selective control of the actuative means to selectively determine the actuation of one recording device of each set.

26. Recording apparatus comprising two sets of recording devices normally in *statu quo*, the devices of one set being formed to record the hours and the devices of the other set being formed to record the minutes and the devices of either set being separately movable into a substantially common record-marking position adjacent to the substantially common record-marking position of the record-marking devices of the other set, actuative means in actuative coöperation with the recording devices, and time-controlled selective means selectively controlling the actuation of the recording devices to effect at a given instant selective actuation of one recording device of the hour set and one recording device of the minute set.

27. Recording apparatus comprising recording mechanism normally stationary but operatable to mark a record upon a record receiving medium, and record-actuative means operatable by such record receiving medium to actuate the recording mechanism to mark the record thereon when such record receiving medium is placed in its record receiving position.

28. Recording apparatus operatable to mark a record upon a record receiving medium and comprising electrical actuative means including a controlling switch operatable by the record receiving medium when placed in record receiving position.

29. Time recording apparatus including recording mechanism normally stationary but operatable to mark any one of a plurality of time records upon a record receiving medium, time-controlled selective means selectively determining the record of the recording mechanism and actuative means coöperative with the record receiving medium and with the recording mechanism so as to be operated by the record-receiving medium and to actuate the recording mechanism subject to the selective means when such record receiving medium is placed in its record receiving position.

30. Recording apparatus operatable to mark any one of a plurality of records upon a record receiving medium and comprising electrical actuative means including a controlling switch operatable by the record receiving medium when placed in record receiving position, and also comprising time-controlled selective means in selective control of the actuative means to selectively determine the record marked upon the record receiving medium.

31. Recording apparatus for marking a record on a record receiving medium and comprising electrically operatable recording mechanism normally in *statu quo* but operatable to make any one of a plurality of records, electrical actuative means in actuative coöperation with the recording mechanism and operatable by the record receiving medium when placed in record receiving position, and time-controlled electrical selective mechanism coöperative with the actuative means to selectively determine the record of the recording mechanism.

32. Recording apparatus for marking a record on a record receiving medium and comprising a plurality of separately movable recording devices arranged to mark their records substantially at a common point on the record-receiving medium, actuative means therefor operatable by the record receiving medium when placed in record receiving position, and time-controlled selective means coöperative with the actuative means to selectively control the actuation of the recording devices.

33. Recording apparatus for marking a record on a record receiving medium and comprising separately movable electrically operatable recording devices and time-controlled electrical selective actuative means in selective actuative coöperation with the recording devices and operatable by the record receiving medium when placed in record receiving position.

34. Time-controlled recording apparatus for marking a record on a record receiving medium and comprising record marking means actuatable by placing the record receiving medium in one of several record receiving positions, and time-controlled positioning means for determining such record receiving position of the record receiving medium.

35. Time-controlled recording apparatus for marking a record on a record receiving medium and comprising time-controlled record marking means actuatable by placing the record receiving medium in one of several record receiving positions, and time-controlled positioning means for determining such record receiving position of the record receiving medium.

36. Time-controlled recording apparatus for marking a record on a record receiving medium and comprising record marking means operatable by placing the record receiving medium in its record receiving position, time-controlled positioning means for determining, with respect to a given coördinate direction, such record receiving and actuative position of the record receiving medium and also positioning means for determining such record receiving and actuative position of the record receiving medium with regard to another coördinate direction.

37. Time-controlled recording apparatus for marking a record on a record receiving medium and comprising record marking means operatable by placing the record receiving medium in its record receiving position, time-controlled positioning means for determining, with respect to a given coördinate direction, such record receiving and actuative position of the record receiving medium and also manually operatable positioning means for determining such record receiving and actuative position of the record receiving medium with regard to another coördinate direction.

38. Time-controlled recording apparatus comprising, in combination, time-controlled record marking means including a record marking ribbon, automatic electrical ribbon-feeding means for feeding the record marking ribbon and means for reversing the feeding direction of such electrical ribbon-feeding means.

39. Time-controlled recording apparatus comprising, in combination, time-controlled record marking means including a record marking ribbon, automatic electrical ribbon-feeding means for feeding the record marking ribbon and automatic means for reversing the feeding direction of such electrical ribbon-feeding means.

40. Time-controlled recording apparatus including time-controlled electrically operatable record marking type, a record marking ribbon coöperative therewith, electrical ribbon-feeding means for feeding the record marking ribbon, and common circuit-controlling means for effecting actuation of the record marking type and the electrical ribbon-feeding means.

41. Time-controlled recording apparatus comprising time-controlled record printing means including a record marking ribbon arranged to print a record on a record receiving medium, and ribbon-feeding means for feeding the record marking ribbon, the record printing means and the ribbon-feeding means being both actuatable by the placing of a record receiving medium in record receiving position.

42. A recording apparatus comprising record printing means including a record marking ribbon adapted to print a record on a record receiving medium, and ribbon-feeding means for feeding the record marking ribbon and actuatable by placing the record receiving medium in its record receiving position.

43. A time-controlled recording apparatus comprising time-controlled record printing means including a record marking ribbon adapted to print a record on a record receiving medium, and ribbon-feeding means for feeding the record marking ribbon and actuatable by placing the record receiving medium in its record receiving position.

44. A time-controlled recording apparatus comprising time-controlled record printing means including a record marking ribbon adapted to print a record on a record receiving medium, and electrical ribbon-feeding means for feeding the record marking ribbon and actuatable by placing the record receiving medium in its record receiving position.

45. Time-controlled recording apparatus comprising time-controlled record printing means including a record marking ribbon arranged to print a record upon a record receiving medium, electrically controllable ribbon-feeding means for feeding the record marking ribbon, and a controlling circuit in control of the ribbon-feeding means and controllable by the act of placing the record receiving medium in its record receiving position.

46. Time-controlled recording apparatus comprising time-controlled record printing means including a record marking ribbon arranged to print a record upon a record receiving medium, the printing means being actuatable by the record receiving medium when placed in its record receiving position, and automatic ribbon-feeding means for feeding the record marking ribbon after each printing operation.

47. Time-controlled recording apparatus comprising record printing means and a record marking ribbon coöperative therewith to print a record upon a record receiving medium, the printing means being actuatable by the record receiving medium when placed in its record receiving position, and automatic ribbon-feeding means also actuatable by introduction of the record receiving medium into its record receiving position to feed the record marking ribbon after each printing operation.

48. Time-controlled recording apparatus comprising record printing means and a record marking ribbon coöperative therewith to print a record upon a record receiving medium, the printing means being actuatable by the record receiving medium when placed in its record receiving position, and automatic ribbon-feeding means actuatable by withdrawal of the record receiving medium from its record receiving position to feed the record marking ribbon after each printing operation.

49. Recording apparatus comprising record marking means, actuative means therefor operatable by placing a record receiving medium one of several in record receiving positions, and a chronometer in control of such actuative means to determine the record receiving position of the record receiving medium in which the same shall effect operation of the said actuative means for the record marking means.

50. Recording apparatus comprising electrically actuatable record marking means, a source of actuative electricity in communication with the record-marking means, and circuit-controlling means governing actuation of the record marking means and operatable by placing a record receiving medium in record receiving position, and a chronometer in control of the circuit-controlling means to determine the record receiving position of the record receiving medium in which the same shall operate such circuit-controlling means to actuate the record marking means.

51. Recording apparatus comprising electrically actuatable record-marking means, a source of actuative electricity communicating therewith through suitable electric transmission means operatable to actuate the record-marking means by a record-receiving medium when placed in record-receiving position, and time-controlled governing means in governing coöperation with the said electric transmission means to determine the record-receiving position of the record-receiving medium in which the same shall operate the electric transmission means to effect actuation of the record-marking means.

52. Recording apparatus comprising electrically actuatable record-marking means, a source of actuative electricity therefor communicating therewith through suitable circuit-controlling means operatable to actuate the record-marking means by placing a record-receiving medium in record-receiving position, and a time-controlled commutator in control of the said circuit-controlling means to determine the record-receiving position of the record-receiving medium in which the same shall operate such circuit-controlling means to actuate the record-marking means.

53. Recording apparatus comprising electrically actuatable record-marking means, a source of actuative electricity communicating therewith through suitable circuit-controlling means operatable by placing a record-receiving medium in any one of a plurality of different record-receiving positions, and time-controlled means in governing relation to such circuit-controlling means to change at periodic times such operative record-receiving positions of the record-receiving medium.

54. Recording apparatus comprising electrically actuatable record-marking means, a source of actuative electricity therefor communicating therewith through suitable circuit-controlling means operatable by placing a record-receiving medium in any one of a plurality of different record-receiving positions determining locations of the records in a plurality of respective spaces on such medium and corresponding to successive intervals of time, and time-controlled means in governing relation to such circuit-controlling means to change at periodic times, demarcating the aforesaid successive intervals, such operative record-receiving positions of the record-receiving medium.

55. Recording apparatus comprising electrically actuatable record-marking means, a source of actuative electricity therefor communicating therewith through suitable circuit-controlling means operatable by placing a record-receiving medium in any one of a plurality of different record-receiving positions determining locations of the records on such receiving medium in respective spaces thereon corresponding to successive days of the week, and time-controlled means in governing relation to such circuit-controlling means to change once each day such operative record-receiving positions of the record receiving medium.

56. Recording apparatus comprising electrically actuatable record-marking means, a source of actuative electricity communicating therewith through suitable circuit-controlling means operatable to actuate the record-marking means by placing a record-receiving medium in record-receiving position and also through time-controlled circuit-controlling means determining the record which shall be made by the record-marking means when actuated at any given instant, and further time-controlled means in governing relation to the first said circuit-controlling means to determine the record-receiving position of the record-receiving medium in which the record-marking means shall be actuated.

57. Recording apparatus comprising electrically actuatable record-marking means, a source of actuative electricity communicating therewith through suitable circuit-controlling means operatable to actuate the record-marking means by placing a record-receiving medium in record-receiving position and also through time-controlled circuit-controlling means determining the record which shall be made by the record-marking means when actuated at any given instant, and further time-controlled means in governing relation to the first said circuit-controlling means to determine, with respect to a given coördinate direction, the record-receiving position of the record-receiving medium in which the record-marking means shall be actuated, and means for determining such actuative record-receiving position of the record-receiving medium with respect to another coördinate direction.

58. Recording apparatus comprising electrically actuatable record-marking means, a source of actuative electricity communicating therewith through suitable circuit-controlling means operatable to actuate the record-marking means by placing a record-receiving medium in record-receiving position and also through time-controlled circuit-controlling means determining the record which shall be made by the record-marking means when actuated at any given instant, and further time-controlled means in governing relation to the first said circuit-controlling means to determine, with respect to a given coördinate direction, the record-receiving position of the record-receiving medium in which the record-marking means shall be actuated, and manually operative means for determining such actuative record-receiving position of the record-receiving medium with respect to another coördinate direction.

59. Recording apparatus comprising electrically actuatable record-marking means and a source of actuative electricity therefor communicating therewith through suitable current transmission means controllable to actuate the record-marking means by either one of a plurality of circuit-controlling devices operatable by introduction of a record-receiving medium into either one of a plurality of respective record-receiving positions, and time-controlled means in control of the circuit-controlling devices to determine which of such devices shall be operated by introduction of the record-receiving medium and thereby to determine the record-receiving position thereof.

60. Recording apparatus comprising electrically actuatable record-marking means, a source of actuative electricity communicating therewith through an actuative circuit continuously open except when the record-marking means is actuated to mark a record, and circuit-closing means in control of the actuative circuit and operatable, by introduction of a record-receiving medium into record-receiving position, to close such circuit and actuate the record-marking means.

61. Recording apparatus operatable to mark any one of a plurality of records and comprising electrical actuative circuits for marking such various records respectively and continuously open except when closed to actuate the apparatus to mark a record, a circuit-closing switch in control of the actuative circuits and operatable by the record-receiving medium when placed in record-receiving position, and the recording apparatus also comprising time-controlled selective means in selective control of the actuative circuits to selectively determine the record which they shall mark upon the rocord-receiving medium.

62. Recording apparatus comprising electrically actuatable record-marking means selectively actuatable to mark any one of a plurality of records, selective actuative electric circuits in actuative coöperation with the record-marking means to actuate the same to mark its various records, a clock movement, a commutator operated by the clock movement and in selective control of the actuative circuits, and a common auxiliary circuit-controlled device in control of all the selective actuative electric circuits.

63. Recording apparatus comprising electrically actuatable record-marking mechanism selectively actuatable to mark any one of a plurality of records indicating hours and to mark any one of a plurality of records indicating minutes, an hour set of actuative electric circuits in actuative coöperation with the record-marking mechanism to actuate the same to mark its various hour-indicating records, a minute set of actuative electric circuits in actuative coöperation with the record marking mechanism to actuate the same to mark its minute-indicating records, a clock movement, and hour and minute commutators operated by the clock movement and selectively controlling the hour and minute sets of actuative circuits respectively.

64. Recording apparatus comprising electrically actuatable recording mechanism selectively actuatable to mark any one of a plurality of records indicating hours and any one of a plurality of records indicating minutes, an hour and a minute set of selective actuative electric circuits in selective actuative coöperation with the recording mechanism to selectively actuate its various hour-indicating and minute-indicating records respectively, positioning means for determining the record-receiving position of a record-receiving medium, selective positioning circuits in selective control of the positioning means to selectively determine the record-receiving position in which the record-receiving medium shall be located by such positioning means, a clock movement, hour and minute commutators operated by the clock movement and selectively controlling the hour and minute sets of actuative circuits respectively, and another commutator also operated by the clock movement and selectively controlling the selective positioning circuits which in turn control the positioning mechanism.

65. Recording apparatus comprising electrically actuatable recording mechanism selectively actuatable to mark any one of a plurality of records indicating hours and any one of a plurality of records indicating minutes, an hour set and a minute set of selective actuative electric circuits in selective actuative coöperation with the recording mechanism to selectively actuate its various hour-indicating and minute-indicating records respectively, day-positioning means for locating a record-receiving medium in various record-receiving positions corresponding to days of the week, selective positioning circuits in selective control of the positioning means to selectively determine the record-receiving position in which the record-receiving medium shall be located by such positioning means, a clock movement, hour and minute commutators operated by the clock movement and selectively controlling the hour and minute sets of actuative circuits respectively and a day-commutator also operated by the clock movement and selectively controlling the selective positioning circuits which in turn control the day-positioning mechanism.

66. Time-controlled recording apparatus for marking a record on a record-receiving medium and comprising electrically controllable positioning means for locating the record-receiving medium in position to receive its record, a source of actuative electricity communicating with the positioning means through suitable electric transmission means, and means for controlling such electric transmission means to control the positioning means so as to vary and determine the record-receiving position of the record-receiving medium.

67. Recording apparatus for marking a record on a record-receiving medium and comprising electrically controllable time-controlled positioning means for locating the record-receiving medium in position to receive its record, a source of actuative electricity communicating with the positioning means through suitable electric transmission means, and a master chronometer in control of such electric transmission means to control the positioning means so as to vary and determine the record-receiving position of the record-receiving medium.

68. Recording apparatus for marking a record on a record receiving medium and comprising electrically controllable positioning means for locating the record-receiving medium in position to receive its record, a source of actuative electricity communicating with the positioning means through suitable electric transmission means, and means for controlling such electric transmission means to control the positioning means so as to vary and determine the record-receiving position of the record-receiving medium.

69. Recording apparatus comprising positioning means for determining the record-receiving position of a record-receiving medium, selective positioning circuits in selective control of the positioning means to selectively determine the record-receiving position in which the record-receiving medium shall be located by such positioning means, a clock movement, and a commutator operated by the clock movement and selectively controlling the selective positioning circuits which in turn control the positioning mechanism.

70. Recording apparatus comprising day-positioning means for locating a record-receiving medium in various record-receiving positions corresponding to days of the week, selective positioning circuits in selective control of the positioning means to selectively determine the record-receiving position in which the record-receiving medium shall be located by such positioning means, a clock movement, and a day-commutator operated by the clock movement and selectively controlling the selective positioning circuits which in turn control the day-positioning mechanism.

71. Recording apparatus comprising positioning means for determining the record-receiving position of a record-receiving medium, selective positioning circuits in selective control of the positioning means to selectively determine the record-receiving position in which the record-receiving medium shall be located by such positioning means, a clock movement, a commutator operated by the clock movement and selectively controlling the selective positioning circuits which in turn control the positioning mechanism, and record-marking mechanism also controllable by the clock movement and arranged to mark a record on the record-receiving medium when such medium is located in its record-receiving position.

In testimony whereof I have affixed my signature in the presence of two subscribing witnesses.

HARRY B. PALMER.

Witnesses:
ALBERT V. T. DAY,
HENRY D. WILLIAMS.